United States Patent
Penny et al.

(10) Patent No.: US 12,269,986 B2
(45) Date of Patent: Apr. 8, 2025

(54) LOW-DENSITY HOLLOW GLASS BEAD (HGB) FLUIDS FOR WELLBORE DRILLING, COMPLETION, AND WORKOVER OPERATIONS

(71) Applicant: ExxonMobil Technology and Engineering Company, Spring, TX (US)

(72) Inventors: Glenn Penny, Houston, TX (US); Vishwas Gupta, Conroe, TX (US); Sai Sashankh Rao, Spring, TX (US); Nikolay M. Kostov, Spring, TX (US); Qian Wu, Conroe, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 18/547,993

(22) PCT Filed: Feb. 3, 2022

(86) PCT No.: PCT/US2022/015075
§ 371 (c)(1),
(2) Date: Aug. 25, 2023

(87) PCT Pub. No.: WO2022/191936
PCT Pub. Date: Sep. 15, 2022

(65) Prior Publication Data
US 2024/0132769 A1  Apr. 25, 2024
US 2024/0228857 A9  Jul. 11, 2024

Related U.S. Application Data

(60) Provisional application No. 63/158,687, filed on Mar. 9, 2021.

(51) Int. Cl.
*E21B 21/08* (2006.01)
*C09K 8/03* (2006.01)
*C09K 8/32* (2006.01)

(52) U.S. Cl.
CPC ............... *C09K 8/32* (2013.01); *C09K 8/032* (2013.01); *E21B 21/08* (2013.01)

(58) Field of Classification Search
CPC ............ C09K 8/32; C09K 8/032; E21B 21/08
See application file for complete search history.

(56) References Cited

U.S. PATENT DOCUMENTS

| 4,116,917 A | 9/1978 | Eckert |
| 6,906,009 B2 | 6/2005 | Shinbach et al. |

(Continued)

OTHER PUBLICATIONS

Vozniak J. et al., "Field Results Document Underbalanced Drilling Success", Petroleum Engineer International, Hart Publications, US, vol. 70, No. 4, Apr. 1, 1997, Abstract Only.

(Continued)

*Primary Examiner* — Silvana C Runyan
(74) *Attorney, Agent, or Firm* — ExxonMobil Technology and Engineering Company—Law Department

(57) ABSTRACT

Embodiments described herein provide enhanced low-density hollow glass bead (HGB) fluids, as well as methods for utilizing such HGB fluids for wellbore drilling operations, completion operations, and workover operations. Such low-density HGB fluids include the following combination of constituents: a base oil, an oil viscosifying agent, HGBs at a concentration in a range between 20 vol % and 60 vol %, an organophilic clay, a clay activator, a surfactant, and (optionally) an H$_2$S scavenger. Moreover, the low-density HGB fluids are suitable for use as lower-density cap fluids for pressurized mudcap drilling (PMCD) operations, alternative drilling fluids for managed pressure drilling (MPD) operations, alternative drilling fluids for conventional drill- (Continued)

ing operations corresponding to very-low-pressure or highly-depleted reservoirs, and/or lightweight fluids for wellbore workover operations.

6 Claims, 15 Drawing Sheets

(56) References Cited

U.S. PATENT DOCUMENTS

| | | | |
|---|---|---|---|
| 7,521,400 B2 | 4/2009 | Samuel | |
| 2005/0101493 A1* | 5/2005 | Bradbury | B41F 31/027 |
| | | | 507/901 |
| 2007/0027036 A1* | 2/2007 | Polizzotti | C09K 8/03 |
| | | | 507/143 |
| 2017/0247606 A1* | 8/2017 | Salla | C09K 8/64 |
| 2019/0145198 A1 | 5/2019 | Fossli | |
| 2019/0145202 A1 | 5/2019 | Vavik | |
| 2020/0332177 A1* | 10/2020 | Hill | C09K 8/92 |
| 2020/0386065 A1* | 12/2020 | Mustafa | E21B 21/08 |
| 2021/0002538 A1* | 1/2021 | Smith | E21B 21/08 |
| 2021/0079291 A1* | 3/2021 | Li | C09K 8/88 |

OTHER PUBLICATIONS

International Search Report and Written Opinion, mailed May 19, 2022, Application No. PCT/US2022/015075, 11 pages.

\* cited by examiner

400

500

800

900

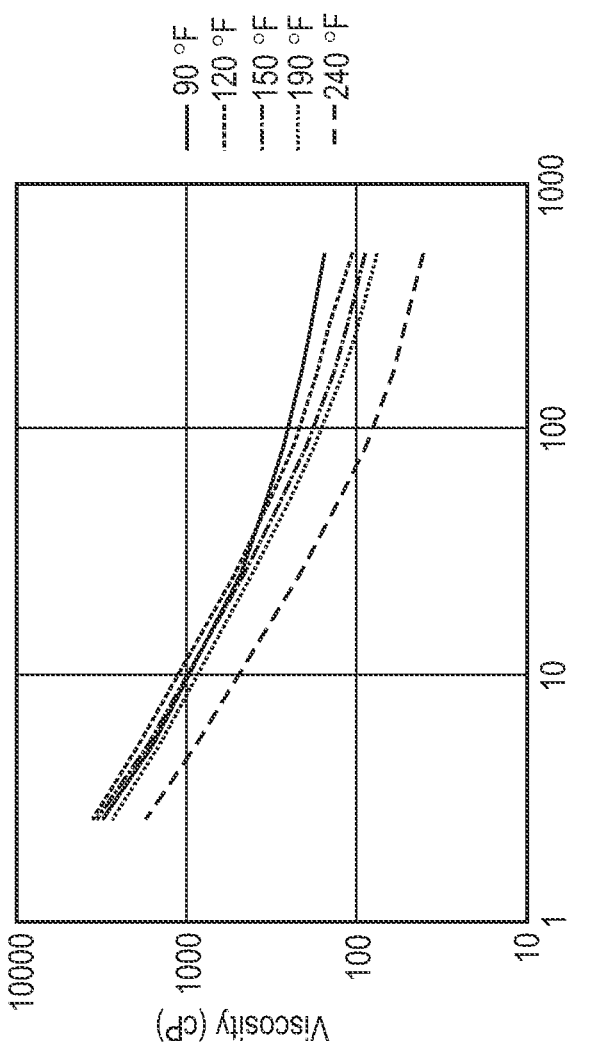
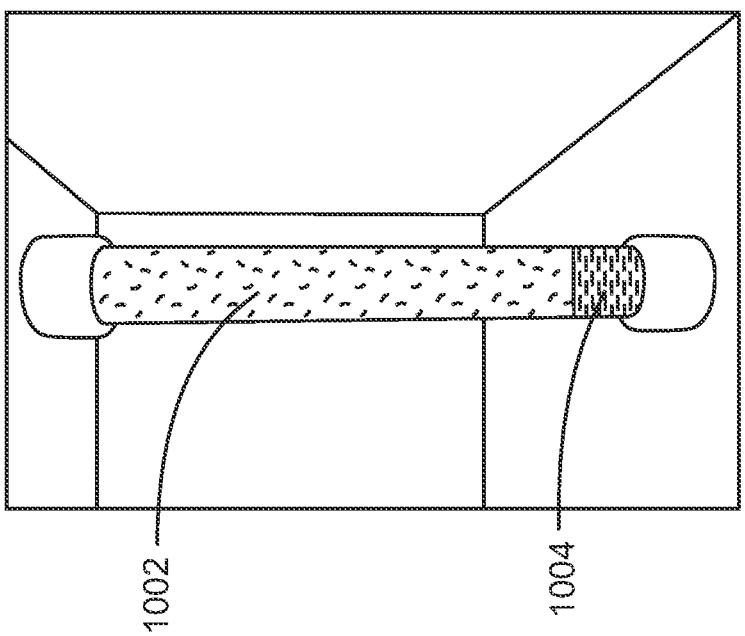
FIG. 10A
FIG. 10B

1100

LOW-DENSITY HOLLOW GLASS BEAD (HGB) FLUIDS FOR WELLBORE DRILLING, COMPLETION, AND WORKOVER OPERATIONS

CROSS-REFERENCE TO RELATED APPLICATIONS

This application is the U.S. National Stage Application of the International Application No. PCT/US2022/015075, entitled "LOW-DENSITY HOLLOW GLASS BEAD (HGB) FLUIDS FOR WELLBORE DRILLING, COMPLETION, AND WORKOVER OPERATIONS," filed on Feb. 3, 2022, the disclosure of which is hereby incorporated by reference in its entirety, which claims priority to and the benefit of U.S. Provisional Application No. 63/158,687, filed on Mar. 9, 2021, the entire contents of which are incorporated herein by reference.

FIELD

The techniques described herein relate to the oil and gas field and, more specifically, to wellbore drilling, completion, and workover operations. In particular, the techniques described herein relate to the development and application of improved low-density hollow glass bead (HGB) fluids for such drilling operations, completion operations, and workover operations.

BACKGROUND

This section is intended to introduce various aspects of the art, which may be associated with embodiments of the present techniques. This discussion is believed to assist in providing a framework to facilitate a better understanding of particular aspects of the present techniques. Accordingly, it should be understood that this section should be read in this light, and not necessarily as admissions of prior art.

In a typical drilling operation for a hydrocarbon well, a borehole or wellbore is formed using a drill bit that is urged downwardly through a subterranean formation at the lower end of a drill string until it reaches a predetermined bottom-hole location that corresponds to a hydrocarbon-bearing interval of the formation, which is generally referred to as a "reservoir." The drill bit is arranged at the end of a drill string extending from a drilling rig, and the drill bit is rotated such that the drill bit's teeth scrape and crush the surrounding rock to form the wellbore as the drill bit advances toward the reservoir. As the wellbore is formed, small pieces of crushed rock, commonly referred to as "drill cuttings," are left behind within the annulus of the wellbore, which is defined as the area between the drill string and the inner wall of the wellbore. Simultaneously, a drilling fluid, often referred to as "drilling mud," is pumped through the drill string, through one or more nozzles within the drill bit, and into the annulus. The drilling fluid provides lubrication for the drill bit. In addition, the circulating drilling fluid carries the drill cuttings produced by the drill bit to the surface via the annulus. Moreover, the density of the drilling fluid is closely monitored and controlled to optimize the drilling operation, prevent the wellbore from fracturing or collapsing, and control the rate of penetration (ROP) of the drill bit.

The drilling operation is then typically followed by a completion operation. During the completion operation, the drill string and drill bit are removed, and the wellbore is lined with steel tubulars, generally referred to as casing strings. A final annulus is thus formed between the casing strings and the surrounding subterranean formation. A cementing operation is then typically conducted to fill this annulus with columns of cement. The combination of the casing strings and the cement strengthens the wellbore and facilitates the zonal isolation of the surrounding subterranean formation.

It is common to place several casing strings having progressively-smaller outer diameters into the wellbore. The first casing string, which serves to isolate and protect the shallower, freshwater-bearing aquifers from contamination by any other wellbore fluids, may be referred to as the "surface casing string." A process of drilling and then cementing progressively-smaller casing strings is then repeated several times below the surface casing string until the hydrocarbon well has reached total depth. The final casing string, referred to as the "production casing string," extends through the reservoir. As part of the completion operation, the production casing string may also be perforated at desired locations throughout the reservoir to create flow paths for hydrocarbon fluids from the reservoir to flow into the hydrocarbon well; this is known as a cased and perforated completion. The completion operation may then be followed by a fracturing operation in which the reservoir rock is fractured to increase the reservoir's productivity. However, one skilled in the art will appreciate that this completion step may vary depending on the details of each application. For example, in some cases, the completion operation may involve the installation of a string of pipe in the reservoir section with pre-perforated holes, as well as packers for isolating different zones in the open hole.

As production continues over time, the liquid hydrocarbons within the reservoir become depleted and, consequently, the reservoir pressure begins to drop. This can create a variety of issues for further drilling and completion operations corresponding to the hydrocarbon well and/or any new hydrocarbon wells to be drilled in the same field. In general, any further development of the field or the existing hydrocarbon well requires the use of techniques for lowering the wellbore pressure acting on the reservoir during drilling to avoid fracturing the rock and losing drilling fluids to the subterranean formation. Several techniques have been developed for this purpose. Such techniques include, for example, underbalanced drilling (UBD), managed pressure drilling (MPD), floating mudcap drilling, and foam drilling. The use of HGB fluids with lower densities can be particularly advantageous as the nearly incompressible liquid is similar to typical drilling fluids and can be introduced into the wellbore with minimal operational changes to the overall drilling operation. Furthermore, if the HGB fluid density is sufficiently low, a fluid column to surface can be achieved, which is desirable from a well monitoring and control standpoint.

Several applications have been reported for utilizing HGB fluids during drilling operations. For example, U.S. Pat. No. 6,906,009 to Shinbach et al., entitled "Drilling Fluid Containing Microspheres and Use Thereof," provides an HGB fluid formulation that is suitable to be used as a drilling fluid replacement for conventional drilling operations. However, for such applications, the HGB fluid is utilized in full circulation mode, meaning that the HGB fluid is pumped down the drill string as the drilling fluid and then returns up the annulus. Moreover, some applications have utilized reduced-density HGB fluids to prevent undesirable fracturing while drilling in reservoirs with reduced formation pressures and fracture pressures. Other applications have utilized reduced-density HGB fluids to increase drilling rates of penetration (ROPs). However, the lowest density HGB fluids that have been successfully formulated and deployed to-date are around 6.5 pounds per gallon (ppg). Therefore, with the continuing declines in reservoir pressures and fracture pressures that are being observed across many fields, the application of such conventional HGB fluids is severely limited for such drilling operations. Accordingly, there exists a need for enhanced, lower-density HGB fluid formulations.

Moreover, there are a number of drilling techniques that may not be optimized using conventional, higher-density drilling fluids, particularly for drilling operations corresponding to highly-depleted, very-low-pressure reservoirs. As an example, for MPD techniques, drilling fluid is typically pumped into the drill string, exits at the drill bit, and then flows back up the annulus to exit at the surface against some backpressure, where the level of backpressure is monitored and used to maintain the downhole annular pressure under static and circulating conditions within the stability mud weight and fracture pressure window. As another example, pressurized mudcap drilling (PMCD) techniques are sometimes adopted when a hydrocarbon well that is being drilled conventionally suffers from severe or total losses. The PMCD technique may be understood as follows. First, conventional drilling progresses by pumping drilling mud into the drill string, which exits at the drill bit and then flows up the annulus to exit at the surface. When a lost returns event occurs due to low reservoir pressure or the presence of a loss zone (e.g. vugular formation, fractured zone), the drilling fluid exits the drill bit and flows into the loss zone, resulting in little to no returns at the surface. As a result, the level of the drilling fluid in the annulus begins to fall. Once the losses have crossed a predetermined limit, the operation is converted to a PMCD operation. Now, the annulus is closed at or near a surface location, and a sacrificial fluid (e.g., water) is pumped down the drill string, while a cap fluid is pumped down the annulus to maintain a certain amount of pressure on the annulus. As another example, several different types of workover operations may be performed for wellbores in depleted reservoirs that are experiencing operational issues, such as issues with reduced production rates. Such workover operations may include, for example, workover operations for pulling and replacing defective production tubing or hardware and workover operations for cleaning proppant and debris out of the wellbore. Moreover, for such workover operations, light-weight fluids are typically used to provide a full column of fluid to the surface and to provide a means for adequately controlling the well during such operations. However, all of these operations (e.g., MPD, PMCD, and workover operations) utilize conventionally-available fluids that are often not optimized for the specific application, particularly for instances in which the corresponding reservoirs are highly depleted, very low pressure, and/or include large lost circulation zones. Accordingly, there exists a need for enhanced fluids for such applications.

SUMMARY

An embodiment described herein provides a method for performing a drilling operation employing pressurized mudcap drilling (PMCD) techniques using a low-density hollow glass bead (HGB) fluid. The method includes drilling a wellbore through a reservoir using a drill bit arranged at the end of a drill string, wherein an annulus is defined between the drill string and the inner wall of the wellbore. The method also includes closing the annulus, pressurizing the annulus by introducing a low-density HGB fluid into the annulus, and pumping a sacrificial fluid through the drill string with the low-density HGB fluid placed in the annulus.

In various embodiments, the introduction of the low-density HGB fluid into the annulus, in combination with the pumping of the sacrificial fluid through the drill string, ensures that the wellbore pressure at the loss zone is at or near balance with the reservoir pressure and retards the migration of reservoir fluids from the reservoir to the surface location. In addition, in various embodiments, the method also includes detecting the migration of the reservoir fluids up the wellbore and introducing additional low-density HGB fluid into the annulus to flush the reservoir fluids back into the reservoir. Furthermore, in some embodiments, the method includes filling the annulus entirely with the low-density HGB fluid up to the surface location, while, in other embodiments, the method includes filling the annulus with the low-density HGB fluid and at least one other fluid up to the surface location.

In various embodiments, the method includes providing the low-density HGB fluid with a combination of constituents including: a base oil; an oil viscosifying agent to increase the viscosity of the base oil; hollow glass beads (HGBs) at a concentration in a range between 20 volume percent (vol %) and 60 vol % (or in a range between 20 vol % and 60 vol %); an organophilic clay to maintain suspension of the HGBs within the low-density HGB fluid; a clay activator to provide for dispersion of the organophilic clay throughout the low-density HGB fluid; and a surfactant to act as a rheology modifier for the low-density HGB fluid. In such embodiments, the method may also include providing the low-density HGB fluid by suitably mixing a specific formulation of the following combination of constituents: (1) the base oil, wherein the base oil includes diesel, a highly-refined mineral oil, a synthetic oil, or a gas-to-liquid (GTL) fluid, or some combination thereof, (2) the oil viscosifying agent, wherein the oil viscosifying includes a styrene block (SB) copolymer or a Hydrogenated Polyisoprene (HPI) Star polymer, or some combination thereof, and wherein the oil viscosifying agent is added to the low-density HGB fluid at a concentration in a range between 1.0 weight percent (wt %) and 4.0 wt %; (3) the HGBs at the concentration in the range between 20 vol % and 60 vol %; (4) the organophilic clay, wherein the organophilic clay is added to the low-density HGB fluid at a concentration in a range between 0.5 wt % and 2.0 wt %; (5) the clay activator, wherein the clay activator includes an oil-soluble, polar material, and wherein the clay activator is added to the low-density HGB fluid at a concentration in a range between 0.1 wt % and 0.5 wt %; and (6) the surfactant, wherein the surfactant includes a silicone block copolymer, and wherein the surfactant is added to the low-density HGB fluid at a concentration in a range between 0.1 wt % and 2.0 wt %. Moreover, in such embodiments, the method may further include providing the low-density HGB fluid with a hydrogen sulfide ($H_2S$) scavenger as an additional constituent, wherein the $H_2S$ scavenger includes a liquid oil-soluble $H_2S$ scavenger that is added to the low-density HGB fluid at a concentration in a range between 0.1 wt % and 2.0 wt %.

Another embodiment described herein provides a method for performing a drilling operation employing managed pressure drilling (MPD) techniques using a low-density HGB fluid. The method includes drilling a wellbore through a reservoir using a drill bit arranged at the end of a drill string, wherein an annulus is defined between the drill string and the inner wall of the wellbore. The method also includes maintaining a positive surface backpressure on the wellbore while using a low-density HGB fluid such that the low-density HGB fluid circulates down the drill string and up the annulus.

In various embodiments, maintaining the positive surface backpressure on the wellbore ensures that the wellbore bottomhole pressure (during both flowing and static periods) remains within a limited pressure window that is defined by the pore pressure, the formation stability mud weight, and the fracture gradient corresponding to the reservoir. In various embodiments, the method also includes monitoring the wellbore bottomhole pressure, as measured by the equivalent circulating density (ECD) downhole and, in response to detected changes in the wellbore bottomhole pressure, adjusting the positive surface backpressure on the wellbore by introducing the low-density HGB fluid into the wellbore at a higher or lower fluid introduction rate and/or adjusting surface backpressure settings corresponding to the wellbore.

In various embodiments, the method includes providing the low-density HGB fluid with a combination of constituents including: a base oil; an oil viscosifying agent to increase the viscosity of the base oil; HGBs at a concentration in a range between 20 vol % and 60 vol %; an organophilic clay to maintain suspension of the HGBs within the low-density HGB fluid; a clay activator to provide for dispersion of the organophilic clay throughout the low-density HGB fluid; and a surfactant to act as a rheology modifier for the low-density HGB fluid. In such embodiments, the method may also include providing the low-density HGB fluid by suitably mixing a specific formulation of the following combination of constituents: (1) the base oil, wherein the base oil includes diesel, a highly-refined mineral oil, a synthetic oil, or a GTL fluid, or some combination thereof; (2) the oil viscosifying agent, wherein the oil viscosifying includes an SB copolymer or an HPI Star polymer, or some combination thereof, and wherein the oil viscosifying agent is added to the low-density HGB fluid at a concentration in a range between 1.0 wt % and 4.0 wt %; (3) the HGBs at the concentration in the range between 20 vol % and 60 vol %; (4) the organophilic clay, wherein the organophilic clay is added to the low-density HGB fluid at a concentration in a range between 0.5 wt % and 2.0 wt %; (5) the clay activator, wherein the clay activator includes an oil-soluble, polar material, and wherein the clay activator is added to the low-density HGB fluid at a concentration in a range between 0.1 wt % and 0.5 wt %; and (6) the surfactant, wherein the surfactant includes a silicone block copolymer, and wherein the surfactant is added to the low-density HGB fluid at a concentration in a range between 0.1 wt % and 2.0 wt %. Moreover, in such embodiments, the method may further include providing the low-density HGB fluid with an $H_2S$ scavenger as an additional constituent, wherein the $H_2S$ scavenger includes a liquid oil-soluble $H_2S$ scavenger that is added to the low-density HGB fluid at a concentration in a range between 0.1 wt % and 2.0 wt %.

Another embodiment described herein provides a method for using a low-density HGB fluids to enhance a workover operation corresponding to a wellbore. The method includes pumping a low-density HGB fluid into a wellbore during a workover operation such that a column of the low-density HGB fluid is formed that extends from the surface and down the wellbore. The method also includes monitoring the column of the low-density HGB fluid to control wellbore parameters during the workover operation. In some embodiments, the method includes performing the workover operation to accomplish at least one of: (1) cleaning proppant and/or debris out of the wellbore; (2) repairing or replacing a production tubing and/or other wellbore equipment; (3) abandoning a completion interval corresponding to the wellbore; (4) abandoning a completion interval corresponding to the wellbore and drilling a sidetrack hole; or (5) drilling a hole section using coiled tubing and the low-density HGB fluid circulating into the coiled tubing, through a drill bit, and up an annulus of the wellbore.

In various embodiments, the method includes providing the low-density HGB fluid with a combination of constituents including: a base oil; an oil viscosifying agent to increase the viscosity of the base oil; HGBs at a concentration in a range between 20 vol % and 60 vol %; an organophilic clay to maintain suspension of the HGBs within the low-density HGB fluid; a clay activator to provide for dispersion of the organophilic clay throughout the low-density HGB fluid; and a surfactant to act as a rheology modifier for the low-density HGB fluid. In such embodiments, the method may also include providing the low-density HGB fluid by suitably mixing a specific formulation of the following combination of constituents: (1) the base oil, wherein the base oil includes diesel, a highly-refined mineral oil, a synthetic oil, or a GTL fluid, or some combination thereof; (2) the oil viscosifying agent, wherein the oil viscosifying includes an SB copolymer or an HPI Star polymer, or some combination thereof, and wherein the oil viscosifying agent is added to the low-density HGB fluid at a concentration in the range between 1.0 wt % and 4.0 wt %; (3) the HGBs at the concentration in the range between 20 vol % and 60 vol %; (4) the organophilic clay, wherein the organophilic clay is added to the low-density HGB fluid at a concentration in a range between 0.5 wt % and 2.0 wt %; (5) the clay activator, wherein the clay activator includes an oil-soluble, polar material, and wherein the clay activator is added to the low-density HGB fluid at a concentration in a range between 0.1 wt % and 0.5 wt %; and (6) the surfactant, wherein the surfactant includes a silicone block copolymer, and wherein the surfactant is added to the low-density HGB fluid at a concentration in a range between 0.1 wt % and 2.0 wt %. Moreover, in such embodiments, the method may further include providing the low-density HGB fluid with an $H_2S$ scavenger as an additional constituent, wherein the $H_2S$ scavenger includes a liquid oil-soluble $H_2S$ scavenger that is added to the low-density HGB fluid at a concentration in a range between 0.1 wt % and 2.0 wt %.

Another embodiments described herein provides a low-density HGB fluid, including a combination of constituents including: a base oil; an oil viscosifying agent to increase a viscosity of the base oil; HGBs at a concentration in a range between 20 vol % and 60 vol %; an organophilic clay to maintain suspension of the HGBs within the low-density HGB fluid; a clay activator to provide for dispersion of the organophilic clay throughout the low-density HGB fluid; and a surfactant to act as a rheology modifier for the low-density HGB fluid. Moreover, in various embodiments, the low-density HGB fluid is stable at temperatures of up to 350° F.

In some embodiments, the combination of constituents further includes an $H_2S$ scavenger. In such embodiments, the $H_2S$ scavenger may include a liquid oil-soluble $H_2S$ scavenger, and the $H_2S$ scavenger may be added to the low-density HGB fluid at a concentration in a range between 0.1 wt % and 2.0 wt %.

In some embodiments, the formulation of the low-density HGB fluid is determined such that the low-density HGB fluid includes a density in a range between 3.5 ppg and 5.0 ppg, rendering the low-density HGB fluid suitable for drilling applications corresponding to very-low-pressure, highly-depleted reservoirs. In various embodiments the low-density HGB fluid is suitable for use as at least one of: (1) a lower-density cap fluid for a drilling operation employing PMCD techniques; (2) a drilling fluid for a drilling operation employing MPD techniques; (3) a drilling fluid for a conventional drilling operation corresponding to a depleted reservoir with a reduced fracture gradient and a reduced pore pressure; or (4) a lightweight fluid for a wellbore workover operation.

In some embodiments, the formulation of the low-density HGB fluid is determined based, at least in part, on thermal stability testing performed using an experimental lab apparatus including a glass column that is loaded with a specific formulation of constituents and heated to a predetermined temperature as properties of the constituents within the glass column are observed. In such embodiments, the observed properties of the constituents are then used to determine a level of static stability of the specific formulation of the low-density HGB fluid.

In some embodiments, the base oil includes a diesel, a highly-refined mineral oil, a synthetic oil, or a GTL fluid, or some combination thereof. In some embodiments, the oil viscosifying agent includes at least one of an SB copolymer or an HPI Star polymer, and the oil viscosifying agent is added to the low-density HGB fluid at a concentration in a range between 1.0 wt % and 4.0 wt %. In some embodiments, the organophilic clay is added to the low-density HGB fluid at a concentration in a range between 0.5 wt % and 2.0 wt %. In some embodiments, the clay activator includes an oil-soluble, polar material, and the clay activator is added to the low-density HGB fluid at a concentration in a range between 0.1 wt % and 0.5 wt %. In some embodiments, the surfactant includes a silicone block copolymer, and the surfactant is added to the low-density HGB fluid at a concentration in a range between 0.1 wt % and 2.0 wt %.

DESCRIPTION OF THE DRAWINGS

Advantages of the present techniques may become apparent upon reviewing the following detailed description and drawings of non-limiting examples in which:

FIG. 10A is a graph showing the viscosity versus shear rate as the temperature increased for an experimental test of a specific formulation of the low-density HGB fluids provided herein;

FIG. 10B is a schematic view of the glass column used for the experimental test, which shows the level of static stability of the specific formulation of the low-density HGB fluids;

Figure 1:
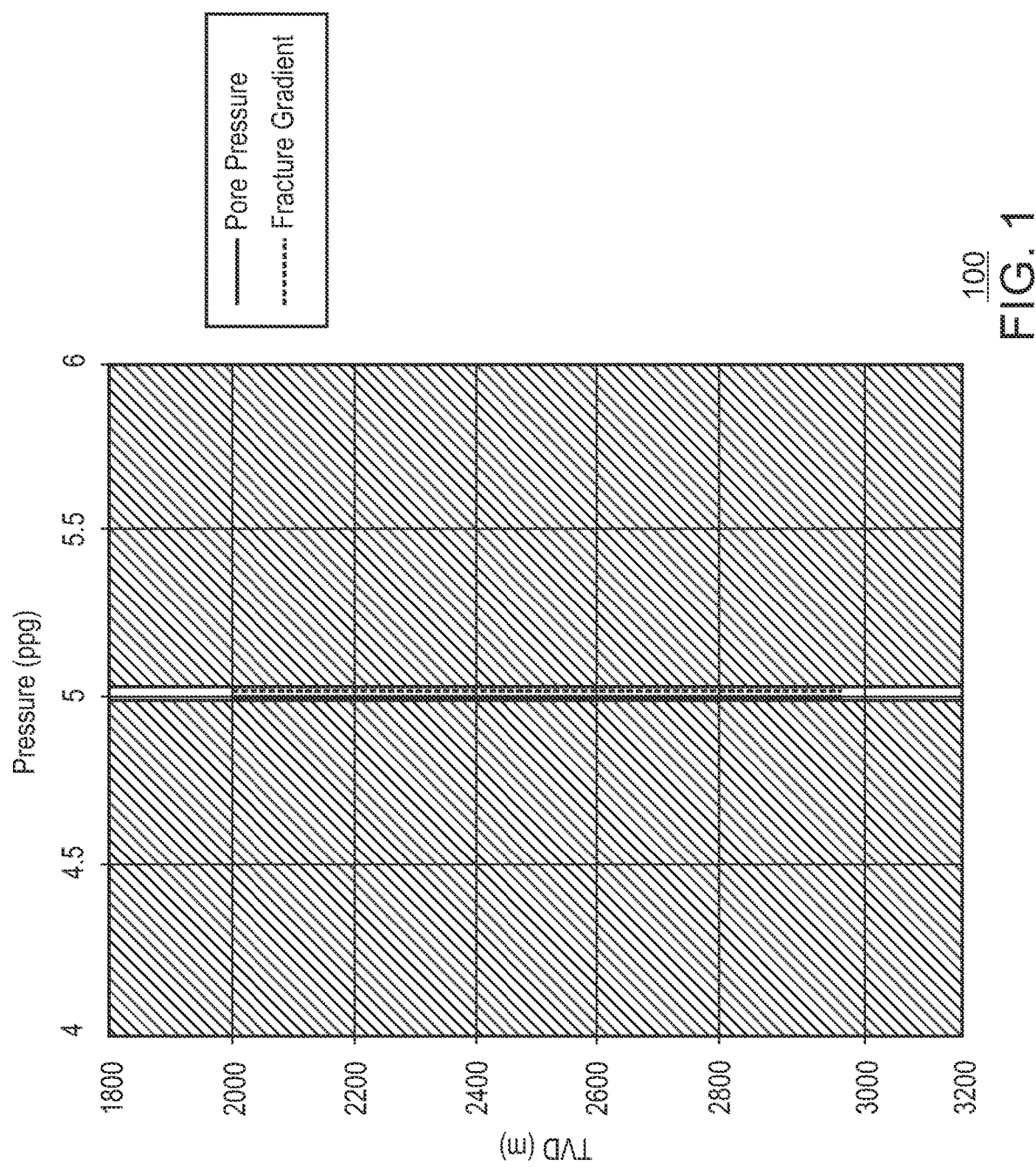
FIG. 1 is a graph showing an exemplary narrow pressure window for a depleted reservoir experiencing lost circulation that may be addressed using pressurized mudcap drilling (PMCD) techniques in combination with the low-density hollow glass bead (HGB) fluids provided herein.

It should be noted that the figures are merely examples of the present techniques and are not intended to impose limitations on the scope of the present techniques. Further, the figures are generally not drawn to scale, but are drafted for purposes of convenience and clarity in illustrating various aspects of the techniques.

DETAILED DESCRIPTION

In the following detailed description section, the specific examples of the present techniques are described in connection with preferred embodiments. However, to the extent that the following description is specific to a particular embodiment or a particular use of the present techniques, this is intended to be for example purposes only and simply provides a description of the embodiments. Accordingly, the techniques are not limited to the specific embodiments described below, but rather, include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

The terms "about" and "around" mean a relative amount of a material or characteristic that is sufficient to provide the intended effect. The exact degree of deviation allowable in some cases may depend on the specific context, e.g., ±1%, ±5%, ±10%, ±15%, etc. It should be understood by one skilled in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

As used herein, the terms "a" and "an" mean one or more when applied to any embodiment described herein. The use of "a" and "an" does not limit the meaning to a single feature unless such a limit is specifically stated.

The term "and/or" placed between a first entity and a second entity means one of (1) the first entity, (2) the second entity, and (3) the first entity and the second entity. Multiple entities listed with "and/or" should be construed in the same manner, e.g., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "configured" means that the element, component, or other subject matter is designed and/or intended to perform a given function. Thus, the use of the term "configured" should not be construed to mean that a given element, component, or other subject matter is simply "capable of" performing a given function but that the element, component, and/or other subject matter is specifically selected, created, implemented, utilized, and/or designed for the purpose of performing the function.

The term "drill cuttings" (or simply "cuttings") refers to small pieces of rock that break away from the formation during the drilling of a wellbore.

The term "drilling fluid" (or "drilling mud" or simply "mud") refers to any of various mixtures of natural clays and polymers, weighting agents, and other materials suspended in water or a petrochemical fluid. Drilling fluid aids the drilling of a wellbore through a formation by performing various functions. For example, the drilling fluid provides lubrication and cooling for the drill bit, carries the drill cuttings produced by the drill bit to the surface, prevents the wellbore from collapsing prior to completion, and helps control the rate of penetration of the drill bit.

The term "equivalent circulating density (ECD)" refers to the equivalent fluid density, which equals the dynamic pressure exerted by a circulating drilling fluid at any point within a wellbore. The ECD is typically greater than the static density of the drilling fluid when it is not circulating within the wellbore. Moreover, the ECD at any given point within the wellbore depends, at least in part, on the true vertical depth (TVD) of the wellbore at that point, the mud flow rate, and the mud density and rheology.

As used herein, the terms "example," exemplary," and "embodiment," when used with reference to one or more components, features, structures, or methods according to the present techniques, are intended to convey that the described component, feature, structure, or method is an illustrative, non-exclusive example of components, features, structures, or methods according to the present techniques. Thus, the described component, feature, structure, or method is not intended to be limiting, required, or exclusive/exhaustive; and other components, features, structures, or methods, including structurally and/or functionally similar and/or equivalent components, features, structures, or methods, are also within the scope of the present techniques.

The term "formation" refers to a subterranean (or subsurface) region including an aggregation of subsurface sedimentary, metamorphic and/or igneous matter, whether consolidated or unconsolidated, and other subsurface matter, whether in a solid, semi-solid, liquid and/or gaseous state, related to the geological development of the subsurface region. A formation can be a body of geologic strata of predominantly one type of rock or a combination of types of rock, or a fraction of strata having substantially common sets of characteristics. A formation can contain one or more hydrocarbon-bearing intervals, generally referred to as "reservoirs." Note that the terms "formation," "reservoir," and "interval" may be used interchangeably, but may generally be used to denote progressively smaller subsurface regions, stages, or volumes. More specifically, a "formation" may generally be the largest subsurface region, while a "reservoir" may generally be a hydrocarbon-bearing stage or interval within the geologic formation that includes a relatively high percentage of oil and gas. Moreover, an "interval" may generally be a sub-region or portion of a reservoir. In some cases, a hydrocarbon-bearing stage, or reservoir, may be separated from other hydrocarbon-bearing stages by stages of lower permeability, such as mudstones, shales, or shale-like (e.g., highly-compacted) sands.

The term "fluid" refers to gases, liquids, and combinations of gases and liquids, as well as to combinations of gases and solids, combinations of liquids and solids, and combinations of gases, liquids, and solids. The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

Generally speaking, the term "fracture gradient" refers to the pressure at which the rock within a formation fractures or breaks, which is converted into a gradient using the true vertical depth. Therefore, the fracture gradient is a useful parameter for mud weight design and for the determination of operational parameters (e.g., mud flow rates) in the drilling industry.

A "hydrocarbon" is an organic compound that primarily includes the elements hydrogen and carbon, although nitrogen, sulfur, oxygen, metals, or any number of other elements may be present in small amounts. As used herein, the term "hydrocarbon" generally refers to components found in natural gas, oil, or chemical processing facilities. Moreover, the term "hydrocarbon" may refer to components found in raw natural gas, such as methane ($CH_4$), ethane ($C_2H_6$), $C_3$ isomers, $C_4$ isomers, benzene, and the like.

As used herein, the term "mud weight" refers to the density of the drilling fluid or mud, typically provided in units of pounds per gallon (ppg). The mud weight is a parameter of drilling fluid that helps to control the drilling operation window and wellbore pressure management requirements. The mud weight is a useful contributor to the hydrostatic pressure and dynamic pressure within the wellbore as a function of vertical depth. Therefore, the mud weight of the drilling fluid can be monitored and controlled such that the drilling fluid adequately supports the range of reservoir pressures encountered during the drilling operation. In addition, the mud weight of the drilling fluid has a direct impact on whether adverse events, such as conditions relating to kicks, lost circulation events, and/or wellbore instability events, occur during the drilling operation. Moreover, the term "equivalent mud weight (EMW)" refers to the total amount of pressure exerted at a particular true vertical depth (TVD) within the wellbore converted to the equivalent fluid density. EMW can be used to describe any downhole property or condition expressed in units of pressure. For example pore pressure, fracture pressure, circulating pressure, and stability mud weight can all be expressed as EMW at each TVD within the wellbore. Relatedly, the term "stability mud weight," refers to the minimum EMW required to prevent wellbore collapse at each TVD within the wellbore.

Generally speaking, the term "pressure" refers to a force acting on a unit area. As used herein, the term "surface pressure" refers to the pressure measured at or near the surface of a wellbore annulus. The surface pressure is typically measured using a gauge that is connected to the surface equipment on the well. Moreover, as used herein, the term "bottomhole pressure" refers to the pressure at the bottom of the wellbore annulus. For circulating wellbores, the bottomhole pressure typically increases with increased fluid friction within the annulus. The bottomhole pressure is also closely correlated to the surface pressure; specifically, the bottomhole pressure is generally equal to the surface pressure plus the hydrostatic pressure within the wellbore under static conditions, and the bottomhole pressure is generally equal to the surface pressure plus the hydrostatic and friction pressures under flowing conditions when the flow of mud in the annulus is from the drill bit to the surface. Similarly, the term "pore pressure" refers to the pressure of the fluids within the formation, commonly expressed as the density of fluid required within the wellbore to balance such pressure.

The bottomhole pressure is one of the primary means of well control for drilling and completion operations. During such operations, the bottomhole pressure is generally maintained above the pore pressure to avoid an influx of formation fluids into the wellbore. In addition, the bottomhole pressure is generally maintained above the stability mud weight to prevent the wellbore collapsing. However, the bottomhole pressure is generally maintained below the fracture gradient to prevent unplanned fractures within the formation. Accordingly, for most drilling and completion operations, it is useful to closely monitor and control the bottomhole pressure to ensure that it remains within the limited available pressure window.

In operation, if the bottomhole pressure is above the pore pressure, the wellbore is referred to as being "overbalanced." If the bottomhole pressure is equal to the pore pressure, the wellbore is referred to as being "balanced." If the bottomhole pressure is below the pore pressure, the wellbore is referred to as being "underbalanced." Moreover, such overbalanced, balanced, and underbalanced conditions have implications for the overall drilling operation.

The terms "rheology" and "rheological properties," when used in relation to a particular fluid, refers to the viscoelastic behavior of the fluid or, in other words, to the manner in which the fluid flows and deforms.

As used herein, the term "true vertical depth (TVD)" refers to the vertical distance from a point in the well (usually the current or final depth) to a point at the surface (often the elevation of the rotary kelly bushing). TVD is one of two primary depth measurements used during drilling operations, the other being the measured depth. TVD is useful for determining bottomhole pressures within the wellbore.

The term "wellbore" refers to a hole drilled vertically, at least in part, and may also refer to a hole drilled with one or more deviated, highly deviated, and/or lateral sections. Relatedly, the term "hydrocarbon well" includes the wellbore itself, as well as the wellhead, casing strings, and other equipment that is typically associated with the extraction of hydrocarbons from a formation.

In this discussion, a "Cx" hydrocarbon refers to a hydrocarbon compound that includes "x" number of carbons in the compound. A stream containing "Cx-Cy" hydrocarbons refers to a stream composed of one or more hydrocarbon compounds that includes at least "x" carbons and no more than "y" carbons in the compound. It is noted that a stream containing "Cx-Cy" hydrocarbons may also include other types of hydrocarbons, unless otherwise specified.

Certain aspects and features are described herein using a set of numerical upper limits and a set of numerical lower limits. It should be appreciated that ranges from any lower limit to any upper limit are contemplated unless otherwise indicated. All numerical values are "about" or "approximately" the indicated value, and account for experimental errors and variations that would be expected by those skilled in the art.

Overview

Embodiments described herein provide enhanced low-density hollow glass bead (HGB) fluids that are capable of being utilized for drilling and completion operations in which conventional fluids cannot be successfully utilized. More specifically, while previous techniques have provided HGB fluids with densities of 6.5 pound per gallon (ppg) and above, embodiments described herein provide low-density HGB fluids with densities of less than 6.0 ppg. For example, the densities of the HGB fluids provided herein may be in the range between 3.5 ppg and 6.0 ppg, depending on the details of the specific application. Moreover, while the higher-density HGB fluids provided by previous techniques were only suitable for drilling in non-depleted to somewhat-depleted reservoirs with normal to somewhat-low-pressure conditions, the low-density HGB fluids provided herein allow for further extension of the envelope for drilling in highly-depleted reservoirs with very-low-pressure conditions. In particular, the low-density HGB fluids provided herein can be used, not only for conventional drilling operations, but also for managed pressure drilling (MPD) and pressurized mudcap drilling (PMCD) operations, as well as for conventional drilling operations that cannot be successfully executed using currently-available drilling fluids and for certain workover operations involving low-pressure reservoirs.

Figure 2:
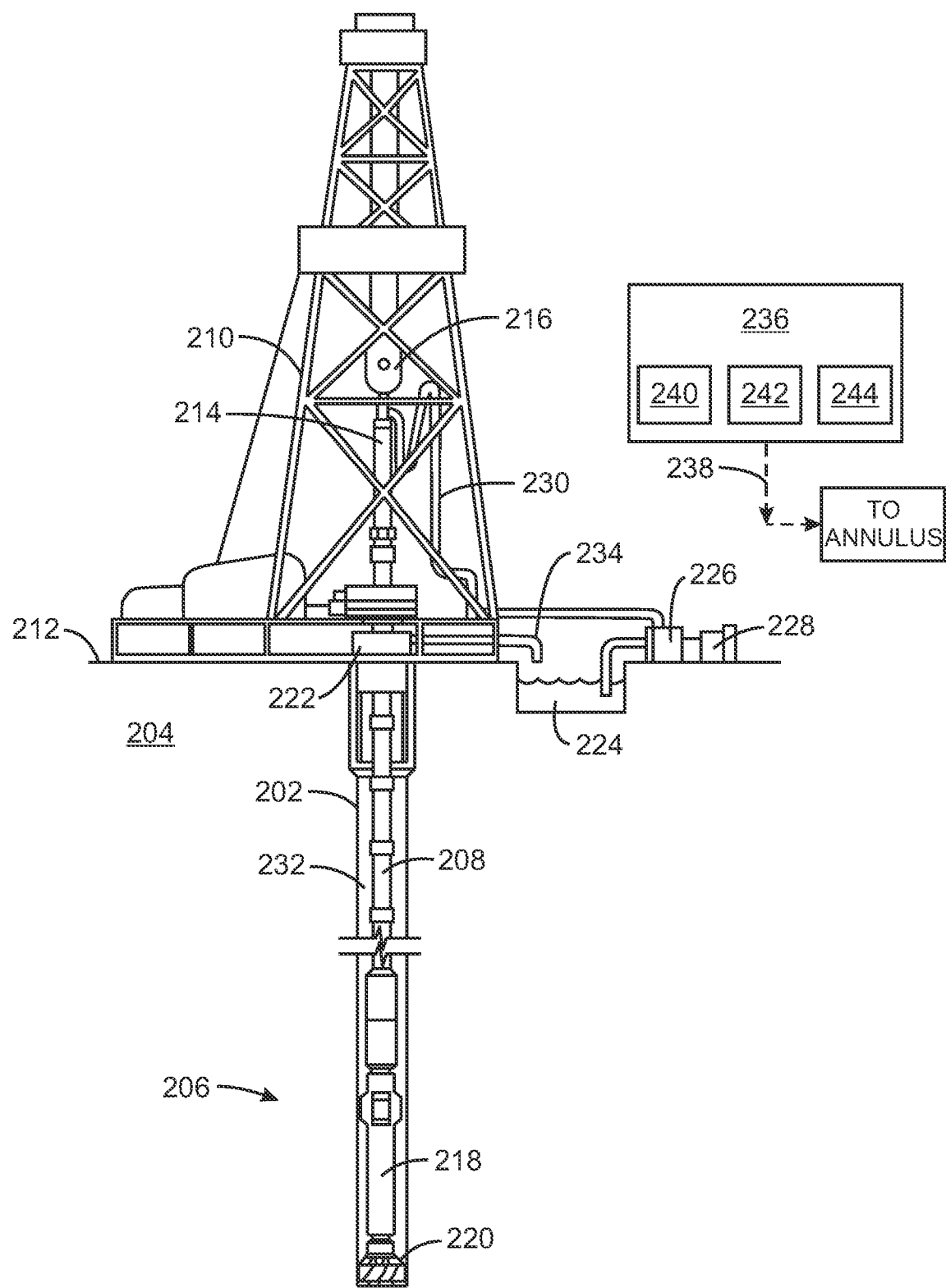
FIG. 2 is a schematic view of an exemplary drilling system for which the low-density HGB fluids described herein may be utilized to implement PMCD techniques.
Figure 3:
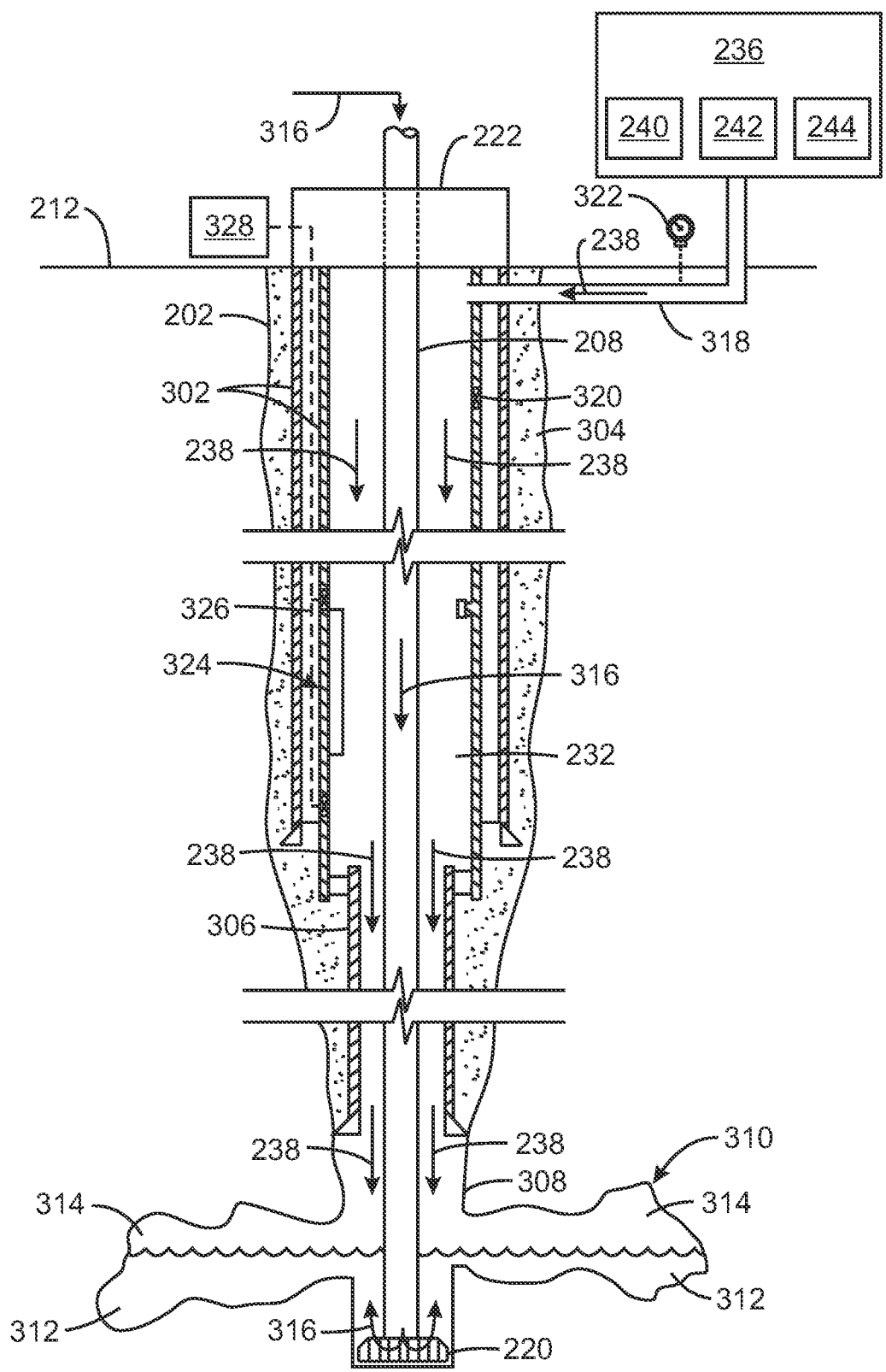
FIG. 3 is an enlarged schematic view of a portion of the exemplary drilling system of FIG. 2.

More specifically, in some embodiments, the low-density HGB fluids are used to extend PMCD techniques by serving as a lower-density cap fluid, as described further with respect to FIGS. 1 to 3. In other embodiments, the low-density HGB fluids are used to enhance MPD techniques by helping to maintain the bottomhole pressure within the acceptable window for each particular application, as described further with respect to FIG. 4. In other embodiments, the low-density HGB fluids are used to enhance conventional drilling techniques by serving as a lower-density drilling fluid for wellbores corresponding to depleted reservoirs, as described further with respect to FIG. 5. Moreover, in other embodiments, the low-density HGB fluids are used to enhance rig or non-rig workover operations corresponding to reservoirs with very low pressures and low fracture gradients. In addition, those skilled in the art will appreciate that the low-density HGB fluids provided herein may also be used for any other suitable type(s) of wellbore drilling and/or completion operations. Furthermore, the use of such low-density HGB fluids is not limited to wellbore drilling and completion operations but, rather, may be extended to any other suitable applications relating to the oil and gas industry (or any other industry that may be benefit from the use of such fluids).

Exemplary Application of Low-Density HGB Fluids to Extend PMCD Techniques

As described herein, the pressure within a reservoir (such as, for example, a karsted carbonate reservoir) decreases as the hydrocarbons within the reservoir become gradually depleted during continued production from a corresponding hydrocarbon well. The reservoir pressure may decline to the point where it can no longer sustain an annular mud column to surface because the hydrostatic pressure (based on annular fluid density and vertical depth of the well) becomes higher than the reservoir pressure. This, in turn, may cause drilling fluid exiting the drill bit to flow into the reservoir rather than returning to the surface via the annulus. In that case, the drilling fluid is "lost" as it progressively fills the reservoir, reducing the hydrostatic column pressure within the annulus and creating one or more large lost circulation zones in the near-wellbore region of the reservoir. Moreover, the presence of such large lost circulation zones often precludes drilling in full circulation mode, as is the standard practice for drilling operations utilizing conventional drilling fluids. As a result, PMCD techniques were developed to drill such reservoirs. For such techniques, circulation of the drilling fluid is halted. A cap of fluid is then held in the annulus, while a separate, sacrificial fluid (e.g., typically water) is sacrificially pumped down the drill string to carry the drill cuttings into the lost circulation zone within the reservoir. As the drilling fluid column within the annulus begins to drop, the liberated reservoir fluids, which may include gases, enter the annulus. Moreover, as the sacrificial fluid flows into the reservoir, buoyancy forces also urge the accumulated reservoir gas out of the reservoir and into the annulus.

In general, the density of the cap fluid used for PMCD techniques is slightly underbalanced to the reservoir fluid equivalent mud weight, thus allowing for a small positive surface pressure. This positive surface pressure is typically monitored and used to evaluate various downhole conditions, including conditions that are indicative of reservoir fluid migration up the wellbore. When such migration is detected, the migrating reservoir fluids are then flushed back into the reservoir by pumping the cap fluid for a certain period of time. However, while PMCD techniques are relatively effective, such techniques are limited by the density of the cap fluid that can be used. To date, the lowest-density applications have used base oils, which have densities as low as around 6.7 pounds per gallon (ppg). Thus, further extension of PMCD techniques is possible if the density of the cap fluid can be reduced lower than the density of base oil. Moreover, to be effective, it is desirable to have a cap fluid with a low enough density so that a fluid column to surface is achievable, particularly for a reservoir containing gas. This allows for enhanced pressure monitoring and well control. The cap fluid has to be stable under downhole pressure and temperature conditions, and the cap fluid's density and rheological properties have to be stable. For example, depending on reservoir depth, downhole geothermal temperatures can be in excess of around 200° F., as an example. Therefore, the formulation for the cap fluid has to be designed to withstand such high temperatures. While a suitable oil viscosifying agent (such as an oil-soluble polymer) can be used for this purpose, most oil-soluble polymers and other viscosifying agents are only stable up to around 180° F. or up to around 200° F., depending on the specific type. Accordingly, merely adding a viscosifying agent does not provide a cap fluid that is stable at temperatures above 200° F.

Furthermore, while higher-density HGB fluids have been used for conventional drilling applications, such HGB fluids consisted of standard invert mud that was modified by the addition of rheology modifiers and hollow glass beads to achieve densities in the range between 6.5 ppg and 13 ppg. However, such higher-density HGB fluids may not be suitable for use in some PMCD applications, where the reservoir pressures are below 6.5 ppg. Therefore, according to embodiments described herein, the low-density HGB fluids are used to extend the PMCD envelope to enable drilling operations to proceed at lower reservoir pressures with minimal additional operating expenditures. In various embodiments, this extension allows for the continued development of fields where PMCD techniques should be used due to lost circulation zones along with pressure depletion that has caused the reservoir pressure to drop below the density of base oils (e.g., around 6.7 ppg).

FIG. 1 is a graph 100 showing an exemplary narrow pressure window for a depleted reservoir experiencing lost circulation that may be addressed using PMCD techniques in combination with the low-density HGB fluids provided herein. As shown in FIG. 1, for this type of reservoir, the fracture gradient may be almost identical to the pore pressure. Moreover, the pore pressure may be below the density of base oils. For example, the pore pressure and the fracture gradient are both around 5 ppg according to the exemplary embodiment shown in FIG. 1, while the density of base oils is around 6.7 ppg. Accordingly, conventional PMCD techniques, which utilize base-oil cap fluids, may not be ideal for this type of environment because a fluid column to surface may not be possible. This becomes particularly useful for well monitoring and control when the reservoir contains gas. Moreover, conventional HGB fluids are also not suitable for this type of environment since such fluids have densities in a range between 6.5 ppg and 13 ppg. Accordingly, in various embodiments, the low-density HGB fluids provided herein, which have densities of less than 6.0 ppg, are utilized to successfully implement PMCD techniques for depleted reservoirs with lost circulation zones. Furthermore, in various embodiments, the low-density HGB fluids provided herein can be formulated such that the fluid's density and rheological properties are specifically tailored to the details of the particular PMCD application. In some embodiments, this may include formulating the low-density HGB fluids with densities as low as 3.5 ppg or as low as 6.0 ppg, for example.

FIG. 2 is a schematic view of an exemplary drilling system 200 for which the low-density HGB fluids described herein may be utilized to implement PMCD techniques. In various embodiments, the drilling system 200 is used to create a wellbore 202 by drilling into the earth 204. The drilling system 200 is configured to accomplish this by driving a bottomhole assembly (BHA) 206 arranged at the bottom of a drill string 208 extended into the earth 204 from a drilling rig 210 (e.g., a derrick) arranged at the surface 212. In some embodiments, the drilling rig 210 includes a kelly 214 and a traveling block 216 used to lower and raise the kelly 214 and the drilling string 208. In other embodiments, however, the kelly 214 is replaced with a top drive or other similar equipment.

The BHA 206 forms an integral extension or portion of the drill string 208. The BHA 206 includes a tool string 218 and a drill bit 220 operatively coupled to the end of the tool string 218. During operation, the drill bit 220 is rotated to progressively penetrate subterranean formations residing within the earth 204 and thereby create the wellbore 202. In some embodiments, the BHA 206 provides directional control of the drill bit 220 as it advances into the earth 204. For example, the tool string 218 may include various measurement tools (not shown), such as, but not limited to, measurement-while-drilling (MWD) and logging-while-drilling (LWD) tools, that may be configured to monitor and report downhole measurements of drilling conditions.

At the surface 212, the drill string 208 extends through a wellhead 222 and into the wellbore 202 below. The wellhead 222 is configured to maintain pressure within the wellbore 202 while simultaneously allowing the drilling string 208 to rotate. The wellhead 222 may include, for example, a rotating control device (RCD), a blowout preventer (BOP), or a combination of the two.

During a drilling operation, a drilling fluid (or mud) from a mud tank 224 is pumped downhole using a mud pump 226 powered by an adjacent motor 228. Specifically, the drilling fluid is pumped out of the mud tank 224 and through a standpipe 230, which feeds the drilling fluid to the drill bit 220 through the drill string 208. The drilling fluid then exits the drill bit 220 at one or more nozzles (not shown) and, in the process, cools the drill bit 220. After exiting the drill bit 220, the drilling fluid circulates back to the surface 212 via an annulus 232 defined between the inner wall of the wellbore 202 and the drilling string 208, and simultaneously returns drill cuttings and debris to the surface 212. The drill cuttings and drilling fluid mixture is then passed through a flow line 234 and processed such that a cleaned drilling fluid is returned downhole through the standpipe 230 once again.

Although the drilling system 200 is shown in FIG. 2 as a land-based drilling system, those skilled in the art will appreciate that many types of drilling systems can be employed in carrying out the embodiments described herein. For instance, the embodiments described herein are applicable to both onshore and offshore drilling rigs. Offshore drilling rigs that may be used according to embodiments described herein include, for example, floaters, fixed platforms, gravity-based structures, drill ships, semi-submersible platforms, jack-up drilling rigs, tension-leg platforms, and the like. Moreover, those skilled in the art will appreciate that embodiments described herein can be applied to drilling rigs ranging anywhere from small in size and portable to bulky and permanent.

According to the embodiment described with respect to FIG. 2, the drilling system 200 is used to implement PMCD techniques for drilling a low-pressure reservoir where lost returns inhibit the ability to maintain a liquid column within the annulus 232 to the surface 212. More specifically, the embodiment described with respect to FIG. 2 relates to maintaining the appropriate pressure balance within the wellbore 202 when a low-pressure reservoir is penetrated during drilling and when the reservoir contains gases. When such a reservoir is penetrated by the drill bit 220, the hydrostatic column pressure within the annulus 232 decreases as the circulating drilling fluid flows into the reservoir instead of returning to the surface 212 via the annulus 232. In some scenarios, the pumped drilling fluid progressively fills the reservoir, at which point a less expensive sacrificial fluid (e.g., water) is instead pumped downhole to fill the reservoir. As the sacrificial fluid fills the reservoir, however, gases within the reservoir, such as methane and hydrogen sulfide ($H_2S$), tend to migrate into the annulus 232, further reducing the hydrostatic column pressure within the annulus 232. Unless the annulus 232 is obstructed, these migrating gases communicate to the surface 212 via the annulus 232, which can result in dangerous conditions at the surface 212.

Therefore, according to the embodiment described with respect to FIG. 2, PMCD techniques are employed to prevent the migration of such gases to the surface 212. For such techniques, the drilling system 200 includes an annular injection system 236 that is configured to formulate, generate, and introduce low-density HGB fluids 238 into the annulus 236 to maintain a hydrostatic cap in the annulus 232 that confines the liberated gases. As described herein, the low-density HGB fluids 238 exhibit properties that allow for the successful inhibition of gas migration to the surface 212. For example, the low-density HGB fluids 238 have a relatively high viscosity that enables the fluid to essentially provide an effective barrier to gas or other fluid migration 232. The relatively high viscosity also prevents the low-density HGB fluids 238 from draining or leaking into the reservoir. Furthermore, as described herein, the low-density HGB fluids 238 have a lower density than base oils. As a result, using the low-density HGB fluids 238 provided herein as the cap fluid enables PMCD techniques to be extended to very-low-pressure, highly-depleted reservoirs that could not be successfully drilled using conventional PMCD techniques.

In various embodiments, the annular injection system 236 includes a fluid generator 240. In some embodiments, the fluid generator 240 is a shearing mechanism or high-shear device that is configured to generate the low-density HGB fluids 238 by shearing (e.g., mixing, agitating, and other similar actions) the constituents. Moreover, in some embodiments, the fluid generator 240 is positioned at the surface 212, and the low-density HGB fluids 238 are thus generated outside the wellbore 202.

In various embodiments, the annular injection system 236 also includes a pump 242. The pump 242 is used to continuously or intermittently pump or inject the low-density HGB fluids 238 into the annulus 232. Accordingly, the pump 242 may be communicably coupled to the annulus 232, either directly or indirectly. In some embodiments, for example, the pump 242 is fluidically coupled to the flow line 234, which communicates with the annulus 232. In other embodiments, the pump 242 is directly coupled to the annulus 232 below the wellhead 222. In other embodiments, the low-density HGB fluids 238 is injected into the annulus 232 via the drill string 208 or a separate injection line. Furthermore, those skilled in the art will appreciate that, in some embodiments, the pump 242 may be omitted altogether, and the low-density HGB fluids 238 may be introduced via other means.

In various embodiments, the annular injection system 236 further includes a computer system 244 that is configured to control and operate the annular injection system 236. In such embodiments, the computer system 244 includes computer hardware used to implement various algorithms for formulating the low-density HGB fluids 238 and injecting the low-density HGB fluids 238 into the wellbore 202, as well for monitoring the performance of the low-density HGB fluids 238 within the wellbore 202. Specifically, the computer system 236 includes a processor (e.g., a microprocessor) configured to execute one or more sequences of instructions, program stances, or code stored on a non-transitory, computer-readable storage medium. By executing such instructions, the processor enables the computer system 244 to control the operation of the fluid generator 240 such that the low-density HGB fluids 238 are produced at a predetermined rate and with predetermined density and rheological properties. In addition, the execution of such instructions by the processor enables the computer system 244 to control the operation of the pump 242 to ensure that the low-density HGB fluids 238 are injected into the wellbore 202 at a suitable flow rate and pressure.

FIG. 3 is an enlarged schematic view of a portion of the exemplary drilling system 200 of FIG. 2. Like numbered items are as described with respect to FIG. 2. As shown in FIG. 3, the wellbore 202 is lined with several casing strings 302 that are secured in place with cement 304. The casing strings 302 generally extend from the wellhead 222 at the surface 212, and one or more wellbore liners 306 extend from (or are "hung off") the casing strings 302. The annulus 232 is defined between the drill string 208 and an inner wall of the wellbore 202, the casing strings 302, and/or the wellbore liner(s) 306 (collectively referred to herein as the "inner wall" of the wellbore 202).

According to the embodiment shown in FIG. 3, the wellbore 202 extends from the bottom-most wellbore liner 306 and provides an open-hole section 308 where the drill bit 220 has penetrated a reservoir 310. It should be noted that, while only one reservoir 310 is depicted in FIG. 3, in some embodiments, the drill bit 220 penetrates a number of reservoirs 310, while implementing the techniques described herein. In some embodiments, the reservoir(s) 310 include vugular formations that include large pores, but such reservoir(s) 310 may also include hydrocarbon-bearing cavities, caves, caverns, fractured zones, and the like. In addition, as shown in FIG. 3, the reservoir 310 includes liquid hydrocarbons 312, as well as gases 314 (e.g., methane, carbon dioxide, and hydrogen sulfide ($H_2S$)).

In various embodiments, once the reservoir 310 has been penetrated, drilling fluid circulated through the drill string 208 becomes "lost" as it flows into the reservoir 310 instead of returning to the surface 212 via the annulus 232. As a result, the column of drilling fluid within the annulus 232 also drops as the drilling fluid leaks into the reservoir 310. When it is determined that the drilling fluid is being lost, such as when the drilling fluid loss rate exceeds a threshold value, drilling operations may cease, and PMCD techniques may be implemented. As described herein, such techniques involve conveying a less-expensive, sacrificial fluid 316 downhole via the drill string 208. The sacrificial fluid 316 may include, for example, water, such as fresh water, seawater, or brine. The sacrificial fluid 316 is ejected from the drill bit 220 via the nozzles (not shown) and may then proceed to fill the reservoir 310.

As the drilling fluid level in the annulus 232 falls, the hydrostatic pressure acting on the reservoir 310 correspondingly decreases. Once this hydrostatic pressure drops close to the reservoir pressure, the reservoir fluids (e.g., including the gases 314) begin to migrate toward the surface 212 via the annulus 232. Moreover, progressively filling the reservoir 310 with the drilling fluid and/or the sacrificial fluid 316 urges the gases 314 out of the reservoir 310 and into the annulus 232 by buoyancy.

According to the embodiment described with respect to FIGS. 2 and 3, to prevent the gases 314 from migrating to the surface 212 via the annulus 232, the annulus 232 is closed, and the annular injection system 236 is operated to introduce (e.g., inject, pump, or other similar operation) the low-density HGB fluids 238 into the annulus 232. In various embodiment, the annular injection system 236 is fluidly coupled to the annulus 232 via a flow line 318. In some embodiments, the flow line 318 is the same as, or similar to, the flow line 234 of FIG. 2. In other embodiments, however, the flow line 318 is coupled to the wellhead 222. In yet other embodiments, the flow line 318 communicates directly with the annulus 232 below the wellhead 222. In further embodiments, the low-density HGB fluids 238 are introduced into the annulus 232 via the drill string 208 or a separate injection line; or, alternatively, the low-density HGB fluids 238 are introduced via other means besides using the pump 242.

In various embodiment, the low-density HGB fluids 238 are generated at the surface 212 using the fluid generator 240, as operated by the computer system 244. The low-density HGB fluids 238 are then continuously or intermittently pumped into the annulus 232 using the pump 242, as also operated by the computer system 244.

In some embodiments, one or more sensors 320 are positioned within the wellbore 202 at a predetermined depth or location. In such embodiments, the sensor(s) 320 are communicably coupled (e.g., via wired or wireless means) to the annular injection system 236 and, more particularly, to the computer system 244. The sensor(s) 320 are configured to monitor conditions within the annulus 232 and communicate detection signals to the computer system 244 for processing. In some embodiments, for example, the sensor(s) 320 are configured to detect the gases 314 and alert the computer system 244 when the gases 314 have reached the sensor 320. Upon detecting the presence of the gases 314, the computer system 244 is programmed to trigger operation of the fluid generator 240 and the pump 242 to generate and pump additional low-density HGB fluids 238 into the annulus 232 to suppress the gases 314.

In some embodiments, the pump rate of the pump 242 is adjusted to maintain a desired consistency of the low-density HGB fluids 238 and/or to maintain a desired surface pressure at or near the wellhead 222 to thereby maintain a hydrostatic cap within the annulus 232 that is sufficient to confine the liberated gases 314. In such embodiments, one or more pressure sensors 322 may be configured to monitor the pressure within the annulus 232 and to send a signal to the annular injection system 236 when the pressure reaches a predetermined pressure limit. The pressure sensor(s) 322 may be positioned within the flow line 318, as shown in FIG. 3, but could alternatively be positioned within the wellbore 202. Moreover, in various embodiments, when the predetermined pressure limit is reached, as detected by the pressure sensor(s) 322, the computer system 244 is programmed to alter the pump rate of the pump 242 to bring the pressure within acceptable limits. Additionally or alternatively, when the predetermined pressure limit is reached, as detected by the pressure sensor(s) 322, the computer system 244 may be programmed to modify the formulation of the low-density HGB fluids 238 for introduction into the annulus 232.

In various embodiments, introduction of the low-density HGB fluids 238 into the annulus 232 is conducted below a closed drilling basket, annular blow-out preventer, or snubbing-type pressure control apparatus, to confine the low-density HGB fluids 238 to the annulus 232. In addition to gravity, the closed upper end of the annulus 232 forces the low-density HGB fluids 238 down the annulus 232 and serves to facilitate buildup of a pressurized hydraulic head within the annulus 232. Because the low-density HGB fluids 238 are introduced into the annulus 232 with a closed upper end (typically within or near the top of the blow out preventor stack, but below the rotating head), the hydrostatic head created by the fluids alone is sufficient to create a "pressurized" annulus 232. However, in some embodiments, the pump 242 that introduces the low-density HGB fluids 238 into the annulus 232 also provides additional introduction pressure within the annulus 232, especially as necessary to overcome any gas migration or wellbore entry pressure within the annulus 232 that the fluids cannot overcome. Either way, the introduction of the low-density HGB fluids 238 into the annulus 232 serves to "pressurize" the annulus 232 sufficiently to halt gas migration and to provide blowout wellbore control, if necessary.

Once the gases 314 have been sufficiently capped by the low-density HGB fluids 238 within the annulus 232 and the drilling operations are completed, the drill string 208 is progressively removed (or "tripped") from the wellbore 202 in preparation for wellbore completion operations. In some embodiments, as the drill string 208 is pulled from the wellbore 202, additional low-density HGB fluids 238 are pumped into the annulus 232 from the annular injection system 236 to compensate for the volume of drill string 208 removed from the wellbore 202 and to keep the reservoir gases 314 from migrating up the annulus 232.

Once the drill bit 220 is reversed past a predetermined location in the wellbore 202, an optional wellbore isolation device 324 may be actuated to close off communication with the wellbore 202. In some embodiments, the wellbore isolation device 324 may be incorporated into or otherwise coupled to the casing strings 302, but it may alternatively be positioned in the wellbore liner 306. In some embodiments, the wellbore isolation device 324 includes one or more flapper valves which can be actuated to isolate the downhole portions of the wellbore 202. In other embodiments, however, the wellbore isolation device 324 includes any other device or mechanism capable of closing off the wellbore 202 and preventing fluid communication to the surface 212. Moreover, in some embodiments, the low-density HGB fluids 238 help to eliminate the need for the wellbore isolation device 234 altogether by providing a column of nearly-incompressible liquid solution to the surface 212.

In some embodiments, one or more control lines 326 extend from the surface 212 to communicate with and operate the wellbore isolation device 324. The control line(s) 326 may include, for example, one or more hydraulic, electrical, or fiber optic lines. At the surface 212, the control line(s) 326 are communicably coupled to an operations module 328. In some embodiments, the operations module 328 forms part of the computer system 244. In other embodiments, however, the operations module 328 includes a separate operational system configured to regulate operation of the wellbore isolation device 324 and any other component systems communicably coupled thereto.

According to embodiments described herein, using the low-density HGB fluids 238 as a lower-density cap fluid for PMCD techniques allow such techniques to be easily and cost-effectively extended to depleted reservoirs with lost circulation zones that could not be effectively mitigated using PMCD techniques with conventional, higher-density cap fluids. Moreover, as described herein, the properties of the low-density HGB fluids 238, including, for example, the fluid density, rheological properties, chemical formulation, and like, can be tailored to each specific application. In this manner, the low-density HGB fluids 238 can be effectively utilized within a wide range of difficult fields without requiring any major process modifications or operating expenditure increases.

Exemplary Application of Low-Density HGB Fluids to Improve MPD Techniques

For some reservoirs with reduced pore pressures and fracture gradients, the bottomhole pressure must be maintained within a limited window that is above the pore pressure (to prevent the formation fluids from flowing into the wellbore) and the stability mud weight (to prevent wellbore collapse), but below the fracture gradient (to prevent the initiation of unplanned fractures within the reservoir). Managed pressure drilling (MPD) techniques allow the pressure profile along the annulus to be closely monitored and controlled by maintaining a surface backpressure on the wellbore. In addition, MPD techniques sometimes utilize HGB fluids to ensure that the bottomhole pressure stays within the limited window between pore pressure, stability MW, and fracture gradient. In various embodiments, the low-density HGB fluids described herein allow such MPD techniques to be easily and cost-effectively utilized for wellbores corresponding to very-low-pressure reservoirs that could not be effectively controlled using the higher-density HGB fluids provided by previous techniques. Moreover, it should be noted that, while foam-based fluids can also be used for MPD techniques, this represents a more complex, costly, and time-consuming solution due to the two-phase nature and high compressibility of such foam-based fluids. Accordingly, embodiments described herein provide enhancements over previous techniques for dealing with such difficult drilling operations.

Figure 4:
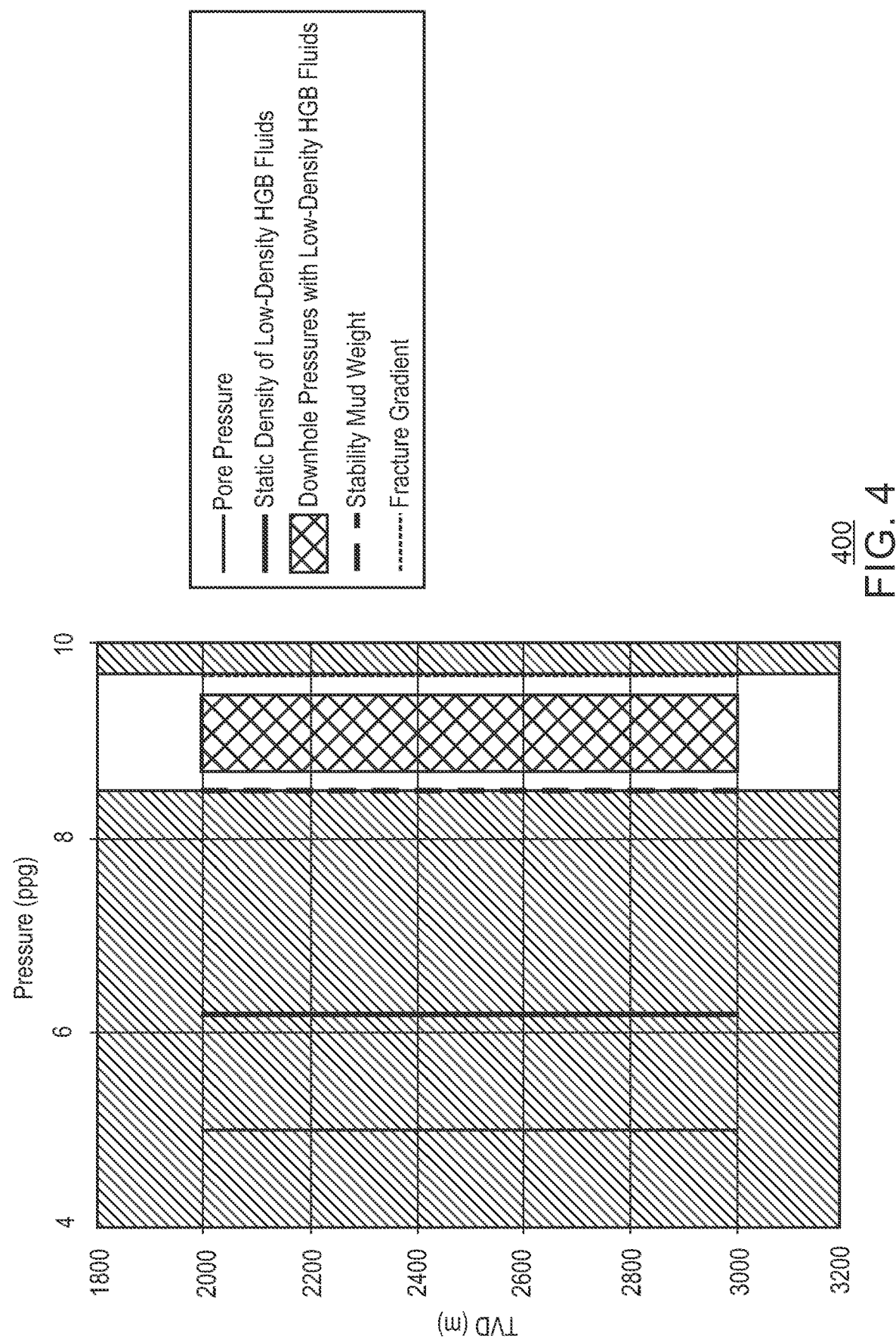
FIG. 4 is a graph showing an exemplary narrow pressure window for a depleted reservoir that may be maintained using managed pressure drilling (MPD) techniques in combination with the low-density HGB fluids provided herein.

FIG. 4 is a graph 400 showing an exemplary narrow pressure window for a depleted reservoir that may be maintained using MPD techniques in combination with the low-density HGB fluids provided herein. For this exemplary embodiment, the depleted reservoir has a reduced fracture gradient and reduced pore pressure. Therefore, MPD techniques are used to maintain positive surface backpressure for formation stability purposes. In particular, when the drilling operation is in circulating mode, the equivalent circulating density (ECD) is between the stability mud weight and fracture pressure, as shown. However, when the drilling operation is not in circulating mode, a higher surface backpressure may be necessary to increase the bottomhole pressure from the static mud weight (shown to be less than the stability mud weight) to above the stability mud weight. In these circumstances, if the stability mud weight and fracture gradient are low due to a depleted reservoir, and the window between the stability mud weight and the fracture gradient is relatively narrow, the low-density HGB fluids provided herein may be successfully utilized to maintain the ECD within the narrow window for the depleted reservoir. For example, according to the embodiment shown in FIG. 4, the window between the stability mud weight and the fracture gradient is in the range between about 8.4 ppg and about 9.6 ppg, and low-density HGB fluid with a static density of around 6.2 ppg is utilized to maintain the downhole pressure within the available window.

Figure 5:
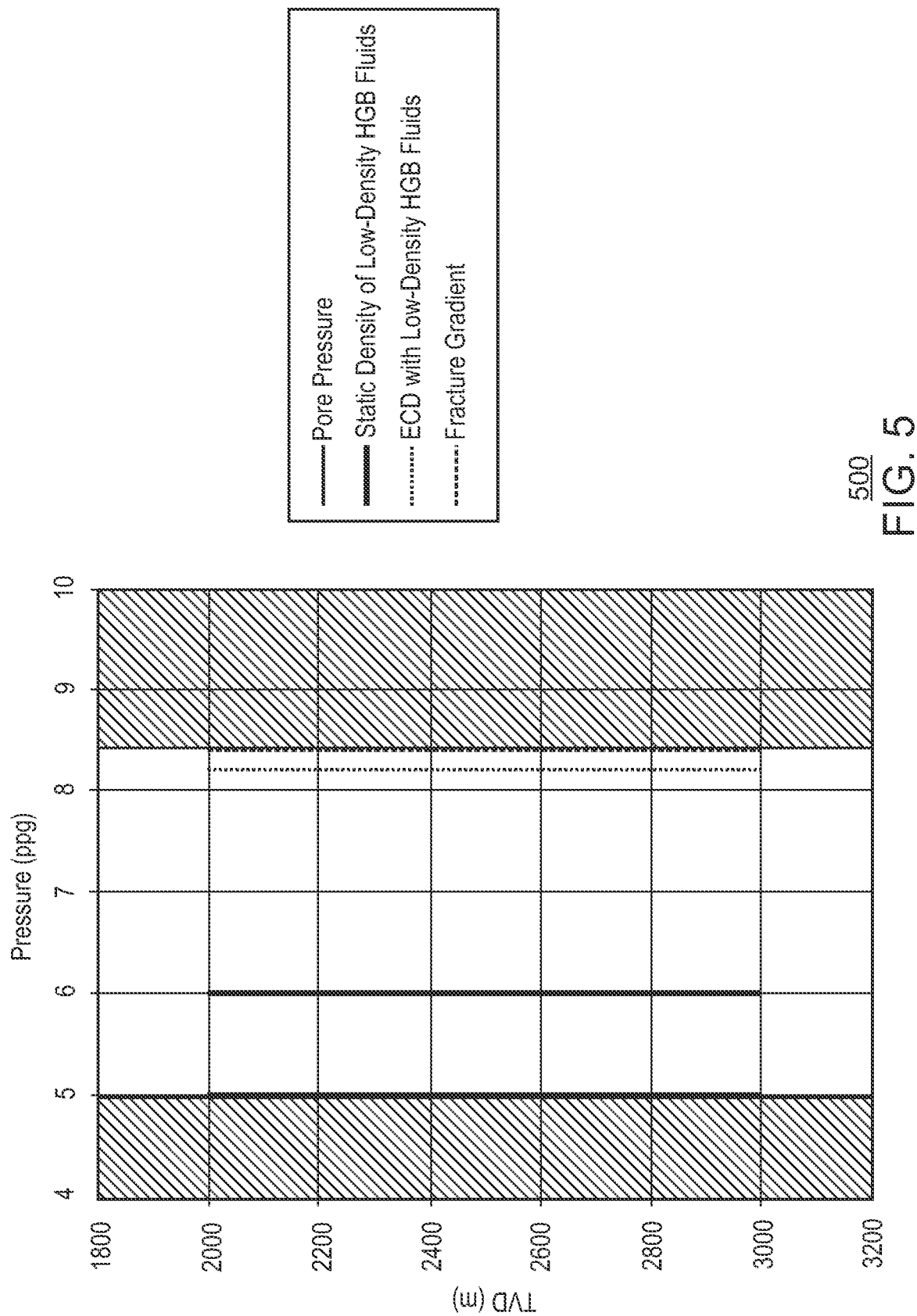
FIG. 5 is a graph showing an exemplary reduced fracture gradient for a depleted reservoir that may be addressed using conventional drilling techniques in combination with the low-density HGB fluids provided herein.

Exemplary Application of Low-Density HGB Fluids to Improve Conventional Drilling Techniques FIG. 5 is a graph 500 showing an exemplary reduced fracture gradient for a depleted reservoir that may be addressed using conventional drilling techniques in combination with the low-density HGB fluids provided herein. More specifically, the graph 500 of FIG. 5 represents a depleted reservoir with a reduced fracture gradient and reduced pore pressure. In this case, conventional drilling mode may still be utilized for the drilling operation if the traditional drilling fluid is replaced with a lower-density fluid that is able to maintain the bottomhole pressure during circulation, which is also known as the equivalent circulating density (ECD), below the fracture gradient. Previous techniques have provided for the use of HGB fluids as the drilling fluid replacement. However, such techniques only provide HGB fluids with densities in range between 6.5 ppg and 13.0 ppg. Accordingly, in various embodiments, the low-density HGB fluids provided herein are used as the drilling fluid replacement for conventional drilling applications requiring fluid densities in a range between 3.5 ppg and 6.0 ppg. For example, according to the embodiment shown in FIG. 5, the fracture gradient is around 8.4 ppg, and low-density HGB fluid with a static density of around 6 ppg is utilized to provide an ECD of around 8.2 ppg, which is below the fracture gradient. This enhancement of conventional drilling techniques provides the advantage of allowing drilling operations to proceed without any major process modifications or associated operating expenditure increases.

Exemplary Application of Low-Density HGB Fluids to Improve Workover Operations for Low-Pressure Reservoirs As described herein, over the life of some hydrocarbon wells that are hydraulically fractured using proppant, the flowback of proppant from the fractures into the wellbore may result in reduced or choked production. Therefore, if the economics are favorable, a workover operation may be performed to clean out the wellbore. In many cases, this is performed using a coiled tubing unit and a lightweight fluid that caters to the lower pressures within the depleted reservoir(s). According to current techniques, such lightweight fluid typically includes foam or nitrified water. However, such fluids are not ideal for certain applications for which the solids carrying capacity of the fluid is a useful factor, such as, in particular, applications corresponding to very-low-pressure or highly-depleted reservoirs. Therefore, in various embodiments, the low-density HGB fluids provided herein are used as a liquid-only cleanout fluid that is optimal for wellbores corresponding to such low-pressure reservoirs.

Furthermore, in addition to workover operations for cleaning proppant and other debris out of the wellbore, the low-density HGB fluids can be used for other workover operations involving low-pressure reservoirs. Specifically, any workover operations that require low-density fluids due to lower reservoir pressures and lower fracture gradients are candidates for the use of the low-density HGB fluids provided herein. Such workover operations may include, for example, workover operations for pulling the production tubing and associated equipment for replacement or repair, workover operations for isolating certain sections of the reservoir, workover operations to abandon the completion interval, and/or workover operations to abandon the completion interval and drill a sidetrack hole. Moreover, the low-density HGB fluids can be used for workover operations performed with a drilling rig, as well as workover operations performed without a drilling rig (sometimes referred as "non-rig" operations). For example, the low-density HGB fluids may be used for a non-rig coiled tubing operation to perform proppant cleanout for a wellbore corresponding to a late-in-life well that has experienced decreased production rates. For such workover operations, the low-density HGB fluids can be used to provide a full column of fluid to the surface and to provide a means for adequately controlling the well during such operations.

Furthermore, as another example, such workover operations may include coiled tubing drilling operations for depleted reservoirs. For this type of operation, a new section of hole can be drilled while circulating the low-density HGB fluid down the coil and up the annulus to the surface. Those skilled in the art will appreciate that, without the low-density HGB fluid described herein, this type of operation may not be feasible for some highly-depleted reservoirs.

Composition of Low-Density HGB Fluids Provided Herein

The low-density HGB fluids described herein include a unique formulation of several constituents: a base oil, hollow glass beads (HGBs), an oil viscosifying agent that provides suspension and stability at high temperatures, a clay (and corresponding clay activator) and a surfactant that further stabilize the suspension of the HGBs within the fluid mixture, and (optionally) a hydrogen sulfide ($H_2S$) scavenger. The following description provides details regarding exemplary compositions and characteristics for each of these constituents. However, those skilled in the art will appreciate that the type(s) and amount(s) of each constituent may vary depending on the details of each specific implementation.

Hollow glass beads (HGBs), which are sometimes referred to as hollow glass spheres (HGSs), are chemically inert, thermally-stable hollow spheres that are generally made of soda-lime borosilicate with a high strength-to-density ratio. HGBs are commonly used as density-reducing (or de-weighting) agents within both oil- and water-based fluids, such as, for example, drilling fluids for a wellbore drilling operation. In general, a density reduction of up to 2.086 pounds mass per gallon (lbm/gal) can be achieved using HGBs. However, this density reduction is limited by the maximum volume percent (vol %) of HGBs that can be effectively suspended within the drilling fluid, which depends primarily on the rheological properties of the fluid and the maximum packing fraction of the HGB particles. Applications have reported successfully adding up to 30 vol % HGBs to achieve densities in a range between 6.5 ppg and 13 ppg in base and weighted fluids. However, HGB fluids with densities in a range between 6.5 ppg and 13 ppg are not suitable for many drilling and completion operations, such as those corresponding to depleted reservoirs and formations with extensive geological fracturing, poor consolidation, and/or high permeability regions. Therefore, according to embodiments described herein, enhanced HGB fluids are formulated by adding suitable oil viscosifying agent(s), clay(s), clay activator(s), surfactant(s), and (optionally) $H_2S$ scavenger(s) such that the volume percent of HGBs within the fluids can be increased to around 20 to 60 vol % without compromising the stability of the fluids. This, in turn, provides much lower-density HGB fluids, as described with respect to FIG. 6.

There are a number of different types of HGBs that can be used according to embodiments described herein. In general, each HGB type is evaluated based on its corresponding particle size distribution, hydrogen sulfide density, and maximum hydrostatic pressure properties. Moreover, each HGB type includes a corresponding density/strength ratio that affects the amount of glass spheres that are required to reach a given density and to maintain that density in the presence of hydrostatic pressure, shear stress, and internal forces. Examples of suitable HGB types include 3M™ Glass Bubbles, such as, for example, HGS7K32-type beads (which include a listed hydrostatic pressure rating of 7,000 pounds per square inch (psi) (with a 90% survival rate at 32 vol %), a density of 0.32 grams per cubic centimeter (g/cc), and a median particle diameter of 30 microns) and HGS4K28-type beads (which include a listed hydrostatic pressure rating of 4,000 psi (with a 90% survival rate at 32% vol %), a density of 0.28 g/cc, and a median particle diameter of 40 microns). In some embodiments, the desired HGB type is selected based on the details of each particular application. In particular, the desired HGB type may be selected based (at least in part) on the reservoir pressure since the reservoir pressure is close to the typical pressure in the wellbore annulus. For example, for embodiments in which the reservoir pressure is very low, HGS4K28-type beads may be selected, because such beads provide a density reduction of around 0.2 ppg as compared to HGS7K32-type beads.

Figure 6:
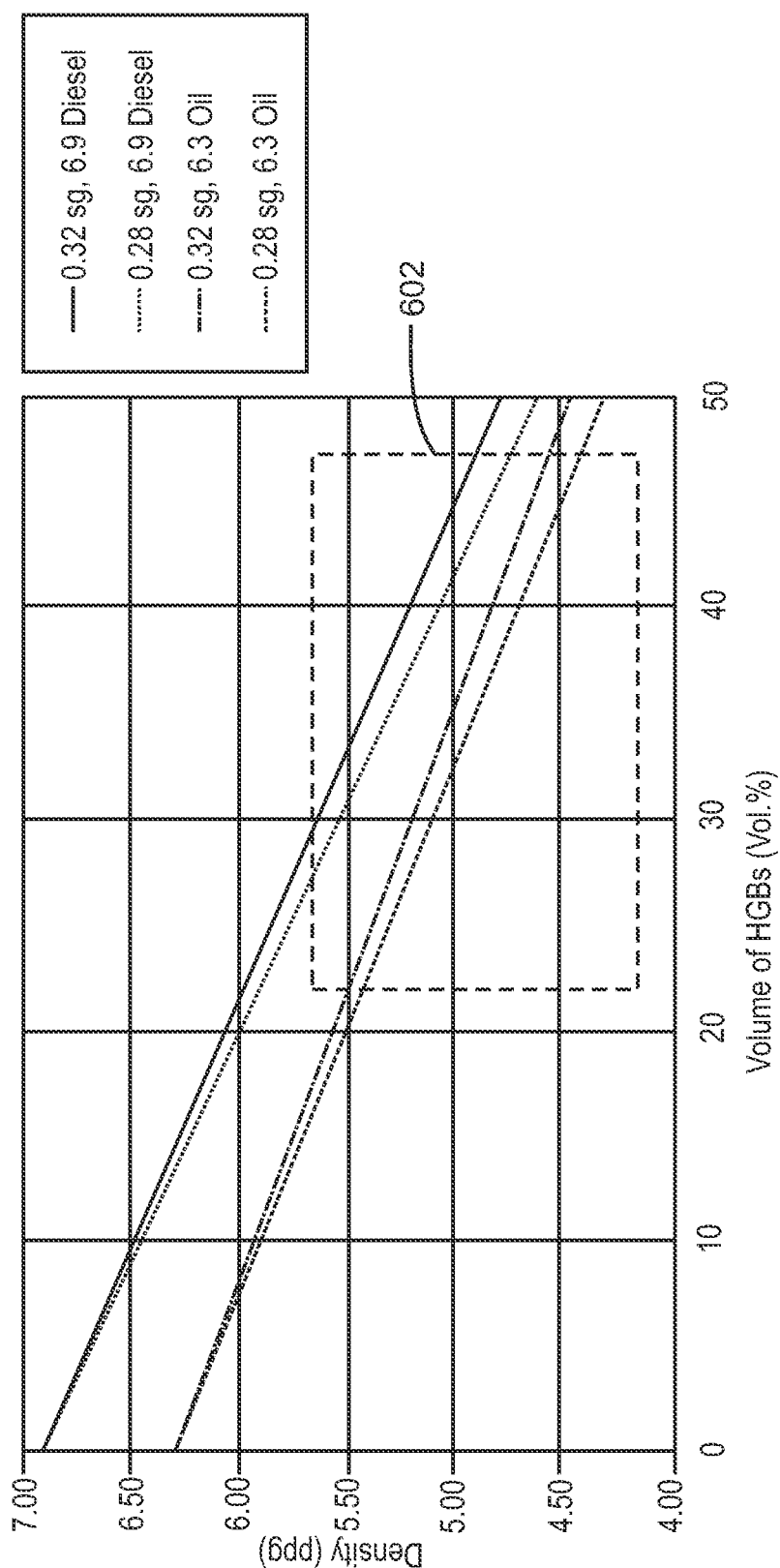
FIG. 6 is a graph showing the possible range of densities as the volume percent of HGBs is increased within a fluid.

FIG. 6 is a graph 600 showing the possible range of densities as the volume percent of HGBs is increased within a fluid. In particular, the graph 600 shows the density (in ppg) of the resulting fluid as a function of the volume (in vol %) of two different HGB products (e.g., HGS7K32-type beads and HGS4K28-type beads) suspended in either diesel or oil. As indicated by the box 602 in FIG. 6, fluid densities can be decreased to well below 6.0 ppg (e.g., in some cases, to as low as 3.5 to 4.1 ppg) with the addition of 20 vol % to 60 vol % HGBs (or, in some embodiments, 35 vol % to 60 vol % HGBs). Accordingly, embodiments described herein take advantage of this untapped window of opportunity by formulating new and enhanced low-density HGB fluids including components that allow the HGBs to maintain suspension and other desired fluid properties at such high concentrations.

Specifically, according to embodiments described herein, the low-density HGB fluids can be formulated using several different combinations of one or more base oils, one or more types of HGBs, one or more oil viscosifying agents (e.g., typically polymers), one or more clays, one or more clay activators, one or more surfactants, and (optionally) one or more $H_2S$ scavengers. This unique combination provides stable, oil-based HGB mixtures that have the desired density properties and are capable of withstanding relatively high temperatures (such as, for example, temperatures of up to around 350° F.) and relatively high pressures (such as, for example, pressures within a range between around 1,000 psi and around 8,000 psi, depending on the details of each implementation), even in the presence of $H_2S$ and other contaminants.

Turning now to the details regarding the other constituents of the low-density HGBs fluids described herein, several different base oils were evaluated for their performance in combination with various oil viscosifying agents. This evaluation resulted in the identification of several base oils that are suitable for use within the low-density HGB fluids described herein. For example, highly-refined mineral oils (such as ExxonMobil's Escaid™ 110, which is a branched C11-C15 paraffinic oil) were identified as suitable base oil. In addition, synthetic gas-to-liquids (GTL) fluids (such as Shell's GTL Saraline 185V, Shell's NEOFLO™ 4633, and Shrieve's BIO-BASE® 625) were identified as potentially-suitable base oils. These oils have pour points lower than −20° F. and also have some of the lowest densities of all the base oils currently in use. Several other oils, including alpha olefins, internal olefins, and Linear Alkyl paraffins, were determined to be generally suitable for applications that do not have strict pour point specifications, since such oils have pour points of over −20° F. Furthermore, diesel, which is widely available and relatively inexpensive, was determined to be a suitable base oil. However, highly-refined mineral oils and synthetic GTL fluids are generally preferred since they are less toxic and more environmentally-friendly.

In general, the type of base oil used has a direct impact on the density properties of the resulting HGB fluids. For example, diesel-based formulations have been developed and tested at densities as low as 4.4 ppg. However, GTL-fluid-based formulations have been proven to provide a density reduction of around 0.3 ppg as compared to diesel-based formulations.

Figure 7:
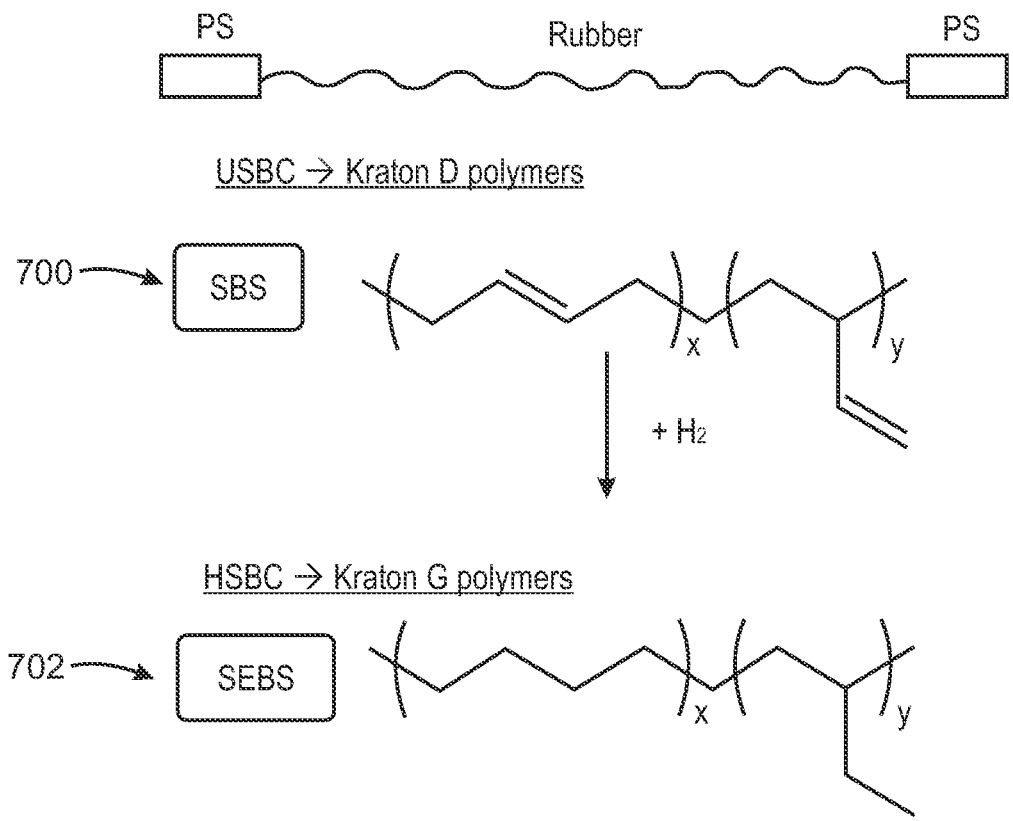
FIG. 7 is a schematic view showing the synthesis of KRATON™ SBS polymers and KRATON™ SEBS polymers, which are suitable for use as an oil viscosifying agent within the low-density HGB fluids provided herein.
Figure 8:
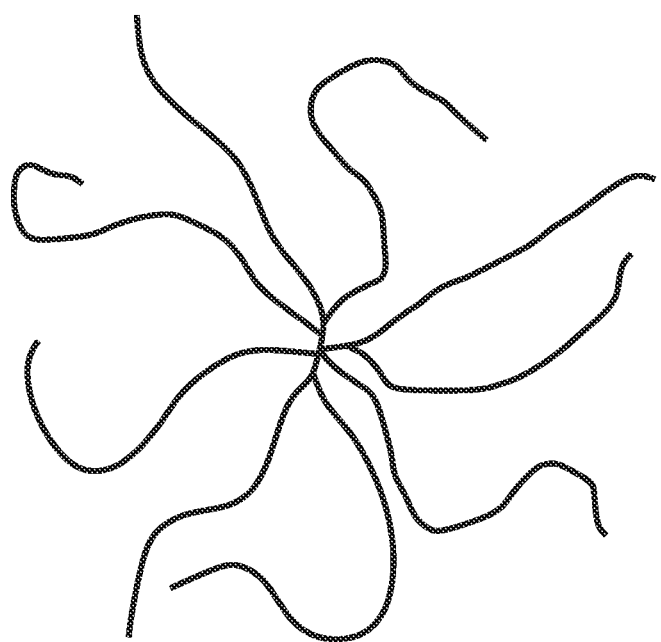
FIG. 8 is a schematic view of the HPI Star polymer, which is suitable for use as an oil viscosifying agent within the low-density HGB fluids provided herein.

Different oil viscosifying agents were also evaluated, resulting in the identification of several oil viscosifying agents that are suitable for use within the low-density HGB fluids described herein. In particular, phosphate ester, iron, and aluminum crosslinkers, as well as several oil-soluble polymers, were evaluated for their performance as oil viscosifying agents. A review of the phosphate ester and aluminum crosslinkers materials is provided by U.S. Pat. No. 7,521,400 B2 to Samuel, entitled "Gelled Oil with Surfactant." As a result of this evaluation, iron was ruled out since it reacts with $H_2S$, which is present in sour oil fields, and was unable to stabilize the mixture at temperatures above around 200° F. In addition, an evaluation of styrene-ethylene-butadiene-styrene (SEBS) and styrene-ethylene-propylene (SEPS) resulted in this combination being selected as the preferred oil viscosifying agent. However, those skilled in the art will appreciate that any number of alternative styrene-ethylene-butadiene or styrene-ethylene-propylene or styrene block (SB) copolymers (or other similar copolymers) can be readily substituted for this combination. FIG. 7 is a schematic view showing the synthesis of KRATON™ SBS polymers, as indicated by arrow 700, and KRATON™ SEBS polymers, as indicated by arrow 702. According to embodiments described herein, two different types of SEPS polymers were evaluated at concentrations in the range between 1.0 weight percent (wt %) and 4.0 wt % in the identified base oils. The first type included the KRATON™ G1702 and M8703 polymers, which are both commonly used in viscosifying oils to suspend polymers to make stable slurries. The second type included the more preferred oil-soluble, isoprene-based KRATON™ G1775 polymer, which is commonly used to viscosify motor oils because of its excellent high-temperature stability. This material is also known as the Hydrogenated Polyisoprene (HPI) Star polymer, and it is described in detail within expired U.S. Pat. No. 4,116,917 to Eckert, entitled "Hydrogenated Star-Shaped Polymer." Moreover, FIG. 8 is schematic view of the HPI Star polymer 800. Furthermore, there are other similar star polymer materials that have been used in the oilfield in viscosifying crude oil for high-temperature foam applications, and these materials were also identified as suitable oil viscosifying agents for the low-density HGB fluids provided herein.

In various embodiments, the incorporation of these polymers into base oil requires temperature in a range between 110° F. and 150° F., as well as high-shear conditions. In this regard, the KRATON™ G1775 polymer is preferred since it can be successfully incorporated into base oils at lower temperatures and with less mixing time than the KRATON™ G1702 and M8703 polymer. The preparation of the materials is aided by employing a shearing system that generates heat, such as Highland Fluid Technology's True-Mud™ Dynamic Mixing-Shearing System.

With respect to the addition of stabilizing clays to the low-density HGB fluids provided herein, organophilic clays were identified as the most suitable type of clay to be added. Those skilled in the art will appreciate that a variety of organophilic clays are available for this purpose. For example, in some embodiments, BYK's CLAYTONE-SF and/or GARAMITE-7303 are used. In addition, in some embodiments, the organophilic cay is added to the low-density HGB fluids at a concentration in a range between 0.5 wt % and 2.0 wt % (e.g., in some cases, in a range between 0.5 wt % and 1.5 wt %). Moreover, according to embodiments described herein, the addition of such clay(s) to the low-density HGB fluids ensures that the HGBs remain suspended within the oil-based fluid and, thus, that the fluid remains stable at the full range of expected temperatures and pressures within the wellbore.

With respect to the addition of a clay activator to the low-density HGB fluids provided herein, a number of suitable materials were identified. The primary characteristics of the identified materials were oil-solubility and being polar in nature. Examples of such materials include propylene carbonate, acetone, methanol, ethanol, and water, or any suitable combinations thereof. In various embodiments, the clay activator is added to the mixture after the addition of the organophilic clays. Once added, the clay activator helps to provides hydrogen bonding between the clay platelets to promote increased swelling and viscosity. Suitable dosage of the clay activator is useful for stabilizing the low-density HGB fluids since the clay activator provides for the dispersion of the organophilic clays within the mixture. Moreover, if too much clay activator is added to the mixture, the swelling and viscosity of the mixture may drop. According to a preferred embodiment, a range between 0.1 wt % and 0.5 wt % (e.g., in some cases, a range between 0.1 wt % and 0.3 wt %) propylene carbonate (95% active) is added to the low-density HGB fluids, although this amount may be adjusted based on the weight of the base oil.

Figure 9:
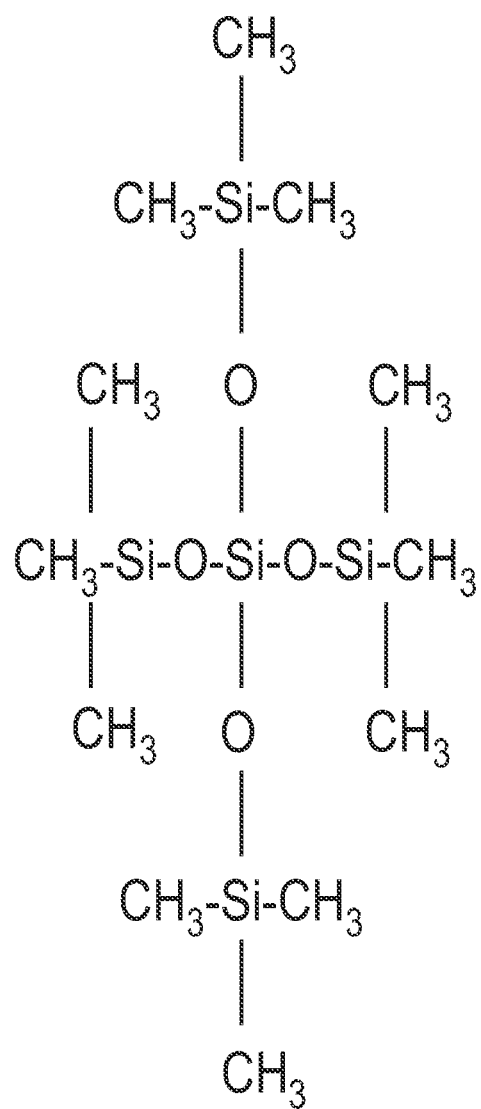
FIG. 9 is a schematic view of the structural formula for a specific silicone block copolymer that is suitable for use as a surfactant within the low-density HGB fluids provided herein.

According to embodiments described herein, a surfactant is also added to the low-density HGB fluids to act as a rheology modifier that enhances the wetting properties of the organophilic clay. More specifically, the surfactant coats or oil-wets the surface of the glass spheres and the clay to hold the particles apart and, thus, create a colloidal dispersion. In this regard, 30 different surfactants were tested for inclusion within the HGB fluids, and several preferred surfactants were selected. In particular, in some embodiments, a silicone resin or silicone block copolymer is used as the surfactant. FIG. 9 is a schematic view of the structural formula 900 for a specific silicone block copolymer that is suitable for use as the surfactant within the low-density HGB fluids provided herein. Specifically, the silicone block copolymer shown in FIG. 9 is Siltech's Silmer® Q9. In other embodiments, a cationic polymeric surfactant is used. For example, ARC's Quarc® 1095 may be used for this purpose. In both embodiments, a range between 0.1 wt % and 2.0 wt % (e.g., in some cases, in a range between 0.1 wt % and 1.0 wt %) surfactant is added to the low-density HGB fluids, in conjunction with the oil-soluble polymers dispersed within the selected base oil, to provide stability at temperatures in a range between 200° F. and 350° F.

In some embodiments, an $H_2S$ scavenger is optionally added to the low-density HGB fluids. In various embodiments, a liquid oil-soluble $H_2S$ scavenger is preferred. For example, materials such as a triazine made with butyl amine, which is available from AquaPharm PChem LLC as H2Stopper 1949, can be used without interfering with the stability of the slurry. Similar suitable and readily-available materials include triazines that are based on propyl, ethyl, or methyl amine. Alternatively, a brine-based triazine based on ethanolamine can be used for both $H_2S$ scavenging and clay activation purposes.

Based on the testing and evaluation performed during the development of the low-density HGB fluids described herein, two exemplary formulations were identified for the low-density HGB fluids, where both formulations include diesel as the base oil. These exemplary formulations are shown below in Table 1, where all numbers correspond to the concentration of the component (in wt %), which is determined based on the concentration of the base oil (in wt %).

TABLE 1

Formulations for Low-Density HGB Fluids
(Based on wt % of Base Oil)

|  | Formulation 1 | Formulation 2 |
| --- | --- | --- |
| Base Oil | Diesel | Diesel |
| KRATON ™ M8703 Polymer | 1.3 | — |
| KRATON ™ G1775 Polymer | — | 1.6 |
| CLAYTONE-SF Clay | 1.5 | 1.5 |
| GARAMITE-7303 Clay | 0.5 | — |
| Silmer ® Q9 Surfactant | 1.0 | 1.0 |
| H2Stopper 1949 | 0.15 | 0.15 |
| HGBs (Type: HGS7K32) | 32.0 | 32.0 |
| Resulting Density (in ppg) | 5.0 | 5.0 |

In addition, 0.3 wt % propylene carbonate (95% active) was added as a clay activator for both formulations, although it is not listed in Table 1. Furthermore, those skilled in the art will appreciate that any number of other formulations may be used for the low-density HGB fluids provided herein. Such formulations may include any suitable types and combinations of the following (non-exclusive) list of constituents: base oil(s), hollow glass beads, oil viscosifying agent(s) (e.g., polymer(s)), clay(s), clay activator(s), surfactant(s), and (optionally) $H_2S$ scavenger(s). In addition, such formulations may be tailored to provide HGB fluids with properties (e.g., density and rheological properties) that are suitable for each particular application. In some embodiments, for example, routine lab experimentation is used to dial in the desired fluid properties. Moreover, in some embodiments, the rheological properties of the low-density HGB fluids are continuously or intermittently measured using one or more pressure drop measurements while pumping on the surface equipment or within the wellbore itself. In such embodiments, the resulting measurements provide helpful information regarding the actual performance of the fluids in the field.

Furthermore, in various embodiments, the low-density HGB fluids are formulated to account for the possibility of bead collapse and/or mechanical crushing within the reservoir. This may be accomplished by performing lab and/or field experimentation to determine the level of HGB breakage for each particular formulation, and then using the results from such experimentation to fine-tune the formulation. In some embodiments, fine-tuning the formulation includes, for example, determining a combination of constituents providing a static density that is compatible with the lost zone depths and pressures for each application.

Those skilled in the art will appreciate that, while embodiments described herein provide details regarding specific formulations of the low-density HGB fluids, such details are for illustrative purposes only. In practice, the low-density HGB fluids may be formulated to suit each particular application. For example, while the HGB fluids are generally described herein as having densities in the range between 4.1 and 6.0 ppg, those skilled in the art will appreciate that lighter, low-density HGBs may be used to provide HGB fluids with densities as low as, for example, around 3.5 ppg according to the present techniques. Moreover, those skilled in the art will appreciate that the concentration of each of the constituents will vary depending on the details of each particular application. For example, there may be some embodiments in which the concentrations of the organophilic clay, clay activator, and/or surfactant are substantially reduced below the exemplary lower bounds provided herein (or, in some cases, even eliminated from the formulation altogether), particularly for embodiments in which the oil viscosifying agent is added at concentrations in a range between 4.0 wt % and 6.0 wt %. Accordingly, the formulation details provided herein are intended to be used for illustrative purposes only, as the formulation may be modified based on the details of each particular application.

Advantages of Low-Density HGB Fluids Described Herein

The low-density HGB fluids described herein provide significant advantages over currently-available drilling fluids, HGB fluids, and oil-based cap fluids. Such advantages include, but are not limited to: (1) simplicity of formulation; (2) lower-density properties; (3) operationally simple and cost effective to implement within existing wellbores; (4) excellent stability properties that enable survival under extreme downhole conditions for extended periods of time, even in the presence of $H_2S$; (5) easily-adaptable formulation that can be tailored to each application; (6) suitable for very-low-pressure, highly-depleted reservoirs that cannot be effectively managed using conventional fluids; (7) nearly incompressible, liquid-only nature that provides significant well control advantages, including reliable downhole pressure monitoring and kick detection; and (8) elimination of the need for downhole wellbore isolation devices in some cases.

Experimental Apparatus for Measuring Stability of Low-Density HGB Fluids Described Herein In various embodiments, thermal and/or pressure stability testing can be performed to determine the suitability of specific formulations for the low-density HGB fluids. Moreover, the results of such thermal and/or pressure stability testing can be used to develop new formulations that are suitable for particular applications.

As described further with respect to FIGS. 10A, 10B, 10C, and 10D, an experimental lab apparatus was successfully assembled and utilized to evaluate the thermal stability of the low-density HGB fluids described herein. This lab apparatus confirmed that the low-density HGB fluids described herein are stable for several days at temperatures in a range between 200° F. and 350° F.

The lab apparatus itself included a glass column that was 250 millimeters (mm) (or 10 inches) long and had an inner diameter of 25 mm (or 1.0 inch). The lab apparatus was designed to withstand pressures of up to 150 psi. For each experiment, the glass column was loaded with the test fluid and placed in an oven at 240° F. A valve pressure gauge attached to the column was then used to allow pressure buildup within the column as the temperature was increased. The pressure buildup within the column was then monitored for safety purposes, while the properties of the test fluid were observed and recorded as the temperature increased.

FIG. 10A is a graph 1000 showing the viscosity (in centipoise (cP)) versus shear rate (in reciprocal seconds (1/s)) as the temperature increased for an experimental test of a specific formulation of the low-density HGB fluids provided herein. FIG. 10B is a schematic view of the glass column 1002 used for the experimental test, which shows the level of static stability of the specific formulation of the low-density HGB fluids. Specifically, for the experimental test represented by FIGS. 10A and 10B, Formulation 1 from Table 1 was used.

As shown in the graph 1000 of FIG. 10A, Formulation 1 of the low-density HGB fluid experienced insignificant viscosity changes at temperatures of up to 190° F., and then experienced low shear viscosity decreases at temperatures in the range between 190° F. and 240° F. This corresponded to in a range between 0.5 inch and 1.0 inch of visible liquid separation within the glass column 1002 after 12 hours at 240° F., as indicated by arrow 1004 in FIG. 10B. Overall, the experimental test showed that Formulation 1 of the low-density HGB fluids is relatively stable at relatively high temperatures and high pressures, even with an HGB concentration that exceeds current manufacturer recommendations.

Figure 10D:
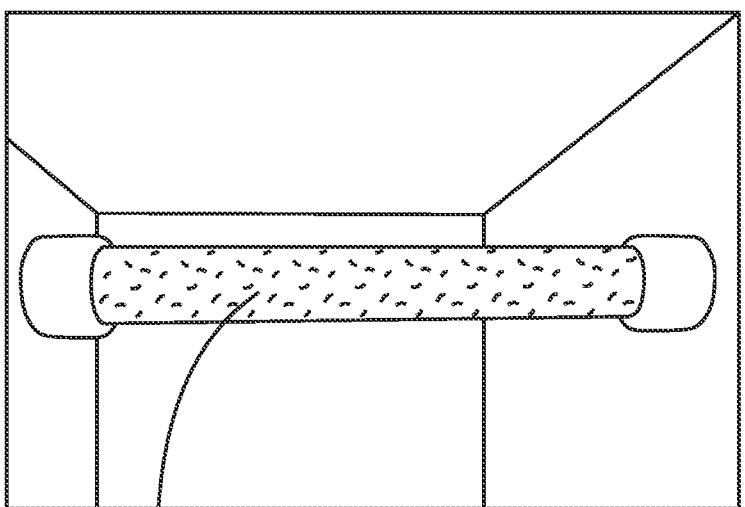
FIG. 10D is a schematic view of the glass column used for the experimental test, which shows the level of static stability of the specific formulation of the low-density HGB fluids.
Figure 10C:
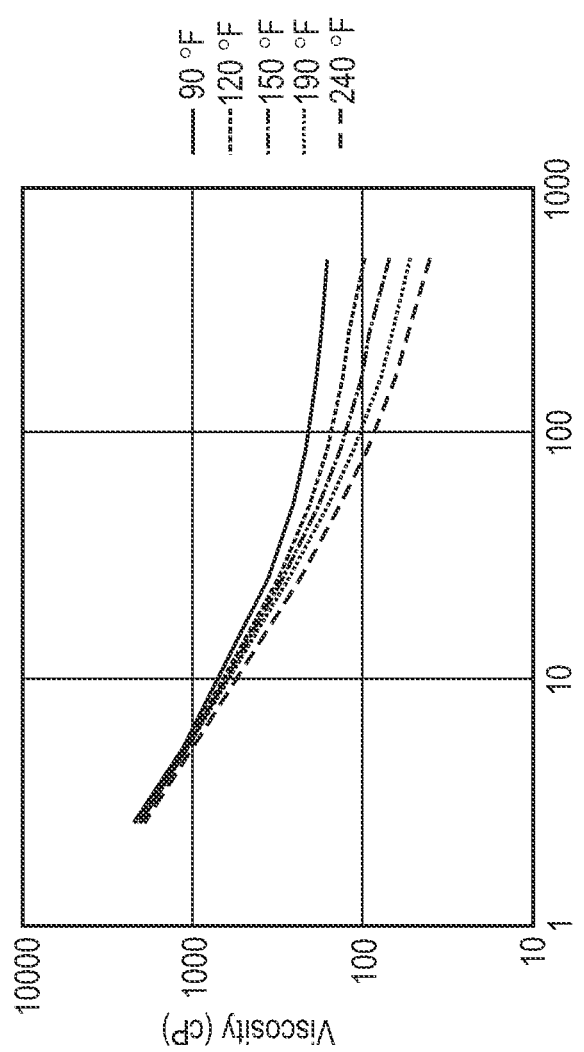
FIG. 10C is a graph showing the viscosity versus shear rate as the temperature increased for an experimental test of another specific formulation of the low-density HGB fluids provided herein.

FIG. 10C is a graph 1006 showing the viscosity (in cP) versus shear rate (in 1/s) as the temperature increased for an experimental test of another specific formulation of the low-density HGB fluids provided herein. FIG. 10D is a schematic view of the glass column 1002 used for the experimental test, which shows the level of static stability of the specific formulation of the low-density HGB fluids. Specifically, for the experimental test represented by FIGS. 10C and 10D, Formulation 2 from Table 1 was used.

As shown in the graph 1006 of FIG. 10C, Formulation 2 of the low-density HGB fluid experienced insignificant low shear viscosity changes as the temperature increased, meaning that the HGBs remained suspended and the fluid was stable. Moreover, the fluid experienced high shear viscosity decreases with temperature, which translates to reduced frictional losses. As shown in FIG. 10D, this corresponded to no visible liquid separation within the glass column 1002 after 12 hours at 240° F. Overall, the experimental test showed that Formulation 2 of the low-density HGB fluids is even more stable than Formulation 1. Therefore, in some embodiments, Formulation 2 is the preferred formulation.

Because many reservoirs include acid gases, such as, in particular, $H_2S$, the low-density HGB fluid was also tested to determine whether it is compatible with such sour reservoirs. Specifically, $H_2S$ testing was performed by contacting the fluid with 17% $H_2S$ at 800 psi overnight. The results showed that the $H_2S$ had little to no effect on the fluid's stability, and no adverse chemical reactions were observed. Accordingly, the low-density HGB fluids provided herein are compatible with sour reservoirs including relatively high concentrations of acid gases.

Method for Formulating Low-Density HGB Fluids Provided Herein

Figure 11:
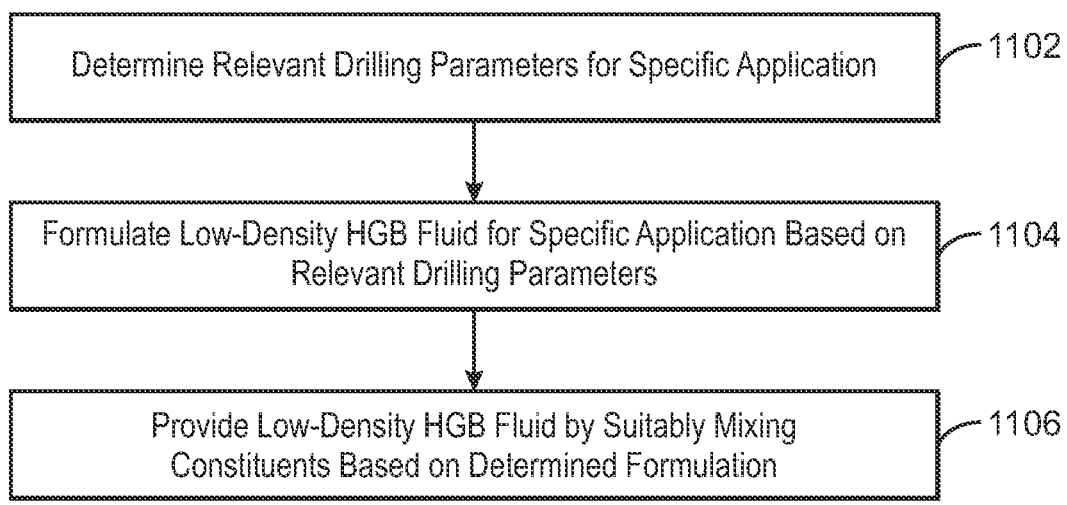
FIG. 11 is a process flow diagram of a method for formulating the low-density HGB fluids provided herein.

FIG. 11 is a process flow diagram of a method 1100 for formulating the low-density HGB fluids provided herein. The method 1100 begins at block 1102, at which a determination is made regarding relevant drilling parameters for the specific application. Such drilling parameters may include, but are not limited to, the pore pressure within the reservoir, the stability mud weight for the wellbore, the fracture gradient within the reservoir, the current equivalent circulating density (ECD) within the wellbore (which corresponds to the current wellbore bottomhole pressure), the preferred ECD within the wellbore (which corresponds to the preferred wellbore bottomhole pressure), the well path, the reservoir temperature, and the desired viscosity for the drilling operation. In various embodiments, the preferred ECD is determined such that the bottomhole pressure, as measured by the ECD, is maintained within a limited pressure window that is above the pore pressure (to prevent the formation fluids from readily flowing into the wellbore) and the formation stability mud weight (to prevent wellbore collapse), but below the fracture gradient (to prevent the initiation of unplanned fractures within the reservoir).

At block 1104, the low-density HGB fluid is formulated for the specific application based on the relevant drilling parameters. In various embodiments, this is accomplished, at least in part, by performing thermal stability testing using an experimental lab apparatus including a glass column that is loaded with a specific formulation of constituents and heated to a predetermined temperature as properties of the constituents within the glass column are observed. The observed properties of the constituents are then used to determine a level of static stability of the specific formulation of the low-density HGB fluid. Moreover, this may be performed for a variety of different candidate formulations until a suitable formulation is selected. Furthermore, in some embodiments, larger-scale pilot tests may also be used, at least in part, to determine suitable formulations for each specific application.

It will be appreciated by those skilled in the art that block 1104 is optional. For example, in some embodiments, details regarding various formulations may be collected within a list or table. In such embodiments, a suitable formulation option may be quickly selected from the list or table without performing any lab or field experimentation, thus effectively eliminating block 1104.

At block 1106, the low-density HGB fluid is provided by suitably mixing the constituents (e.g., one or more base oils, one or more oil viscosifying agents, one or more types of HGBs, one or more organophilic clays, one or more clay activators, one or more surfactants, and (optionally) one or more $H_2S$ scavengers) based on the formulation determined at block 1104. In some embodiments, the constituents are mixed using a suitable shearing mechanism. For example, because the incorporation of the one or more oil viscosifying agents into the one or more base oils requires high-shear conditions and relatively high temperatures of, for example, around 110-150° F., a heat-generating, high-shear device may be used.

In various embodiments, the type(s) and concentration(s) of the individual constituents are tailored to each specific application. In some embodiments, the one or more base oils include diesel, a highly-refined mineral oil (e.g., ExxonMobil's Escaid™ 110), a synthetic oil (e.g., alpha olefins, internal olefins, and/or Linear Alkyl paraffins), and/or a gas-to-liquid (GTL) fluid (e.g., Shell's GTL Saraline 185V, Shell's NEOFLO™ 4633, and/or Shrieve's BIO-BASE® 625). In some embodiments, the oil viscosifying agent includes one or more styrene block (SB) copolymers, added at a concentration in a range between 1.0 wt % and 4.0 wt %. In other embodiments, the oil viscosifying agent includes a Hydrogenated Polyisoprene (HPI) Star polymer, added at a concentration in a range between 1.0 wt % and 4.0 wt %. In some embodiments, the one or more types of HGBs include a hydrostatic pressure rating of around 1,000 psi to around 8,000 psi and a density of around 0.1 g/cc to around 0.32 g/cc, added at a concentration in a range between 20 vol % and 60 vol % or, in some embodiments, in a range between 35 vol % and 60 vol %. In some embodiments, the one or more organophilic clays are added at a concentration in a range between 0.5 wt % and 2.0 wt %. In some embodiments, the one or more clay activators include an oil-soluble, polar material, added at a concentration in a range between 0.1 wt % and 0.5 wt %. In some embodiments, the one or more surfactants include a silicone block copolymer, added at a concentration in a range between 0.1 wt % and 2.0 wt %. In addition, in some embodiments the one or more (optional) $H_2S$ scavengers include one or more liquid oil-soluble $H_2S$ scavengers added at a concentration in a range between 0.1 wt % and 2.0 wt %.

According to embodiments described herein, the combination of these constituents provides a low-density HGB fluid with a density in a range between 3.5 ppg and 6.0 ppg. In addition, the low-density HGB fluid is stable at temperatures of up to 350° F. Therefore, the low-density HGB fluid is suitable to be used for drilling operations corresponding to certain reservoirs, such as very-low-pressure, highly-depleted reservoirs and/or reservoirs including large lost circulation zones. For example, in some embodiments, the low-density HGB fluid is used as a lower-density cap fluid for a drilling operation employing PMCD techniques. In other embodiments, the low-density HGB fluid is used as a stabilizing drilling fluid (e.g., to stabilize the wellbore by maintaining a positive surface backpressure) for a drilling operation employing MPD techniques. In other embodiments, the low-density HGB fluid is used as a drilling fluid for conventional drilling operations corresponding to a depleted reservoir with a reduced fracture gradient and reduced pore pressure. In yet other embodiments, the low-density HGB fluid is used as a fluid for certain workover operations, such as workover operations including coiled tubing cleanout of proppant from wellbores corresponding to very-low-pressure or highly-depleted reservoirs.

The process flow diagram of FIG. 11 is not intended to indicate that the steps of the method 1100 are to be executed in any particular order, or that all of the steps of the method 1100 are to be included in every case. Moreover, any number of additional steps not shown in FIG. 11 may be included within the method 1100, depending on the details of the specific implementation.

Improved Drilling Methods Utilizing Low-Density HGB Fluids Provided Herein

Figure 12:
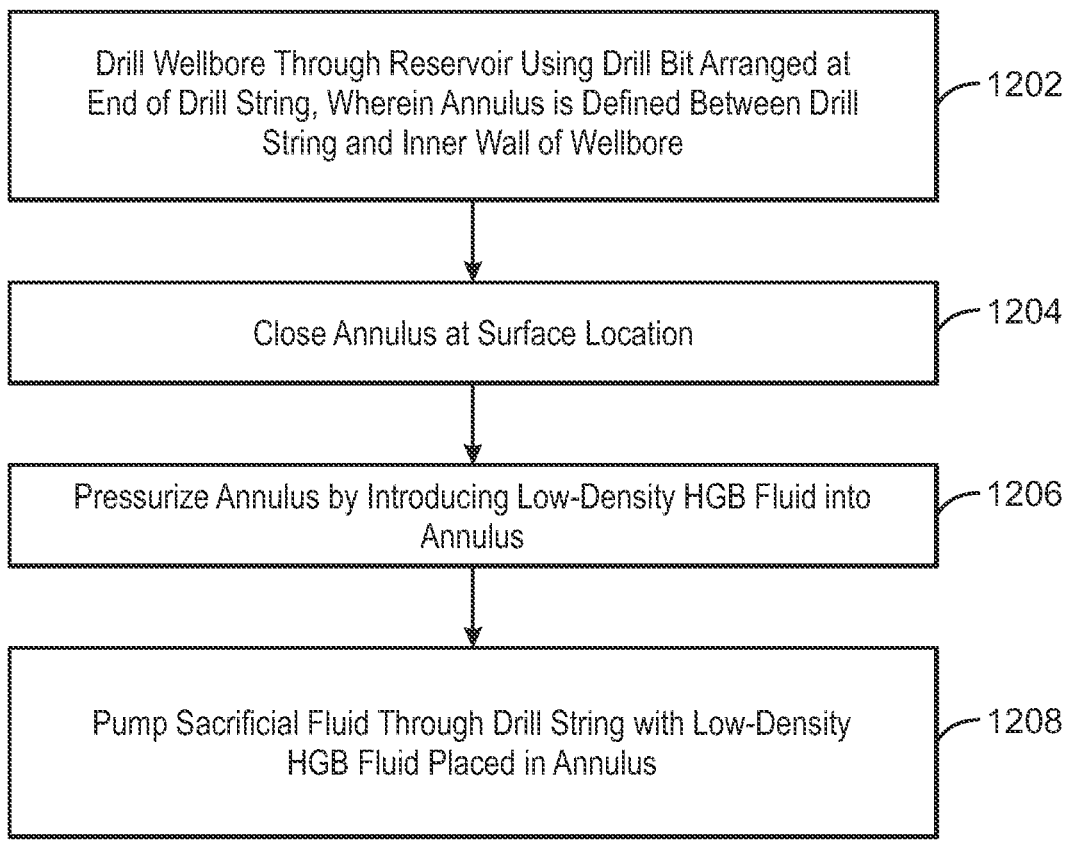
FIG. 12 is a process flow diagram of a method for using the low-density HGB fluids provided herein as the cap fluid for a drilling operation employing PMCD techniques.

FIG. 12 is a process flow diagram of a method 1200 for using the low-density HGB fluids provided herein as the cap fluid for a drilling operation employing PMCD techniques. The method 1200 begins at block 1202, at which a wellbore is drilled through a reservoir using a drill bit arranged at the end of a drill string, wherein an annulus is defined between the drill string and an inner wall of the wellbore. Conventional drilling progresses by pumping drilling fluid into the drill string, which exits at the bit and then flows up the annulus to exit the at the surface. When a lost returns event occurs due to low reservoir pressure or the presence of a loss zone (e.g. vugular cavity), the drilling fluid exits the drill bit and then flows into the loss zone, with little to no returns being carried up the annulus. As a result, the level of drilling fluid in the annulus begins to fall. Once the losses have crossed a predetermined limit, the operation is converted to a PMCD operation.

To begin such a PMCD operation, the method 1200 proceeds to block 1204, at which the annulus is closed at or near a surface location (where the term "surface location" is used herein to refer to any suitable, designated location at or near the top of the wellbore). At block 1206, the annulus is pressurized by introducing a low-density HGB fluid into the annulus. In various embodiments, the low-density HGB fluid includes a combination of constituents formulated to provide a density within a range between 3.5 ppg and 6.0 ppg. In various embodiments, the combination of constituents includes a base oil, an oil viscosifying agent to increase a viscosity of the base oil, HGBs at a concentration in a range between 20 vol % and 60 vol %, an organophilic clay to maintain suspension of the HGBs within the low-density HGB fluid, a clay activator to provide for dispersion of the organophilic clay throughout the low-density HGB fluid, a surfactant to act as a rheology modifier for the low-density HGB fluid, and (optionally) an $H_2S$ scavenger. In addition, at block 1208, a sacrificial fluid is pumped through the drill string with the low-density HGB fluid placed in the annulus. In various embodiments, the introduction of the low-density HGB fluid into the annulus, in combination with the pumping of the sacrificial fluid through the drill string, ensures that the wellbore pressure at the loss zone is at or near balance with the reservoir pressure and retards the migration of reservoir fluids from the reservoir to the surface location.

In some embodiments, the method 1200 further includes detecting the migration of reservoir fluids up the wellbore (e.g. using surface pressure readings) and, in response, introducing additional low-density HGB fluid into the annulus to flush the reservoir fluids back into the reservoir. In addition, in some embodiments, the method 1200 includes filling the annulus entirely with the low-density HGB fluid up to the surface location, while, in other embodiments, the method 1300 includes filling the annulus with the low-density HGB fluid and at least one other liquid or gas fluid up to the surface location.

In various embodiments, the method 1200 includes determining a formulation for the low-density HGB fluid by: (1) performing thermal stability testing using an experimental lab apparatus including a glass column that is loaded with a specific formulation of constituents and heated to a predetermined temperature as properties of the constituents within the glass column are observed; and (2) utilizing the observed properties of the constituents to determine a level of static stability of the specific formulation of the low-density HGB fluid. Furthermore, in various embodiments, the method 1200 includes providing the low-density HGB fluid by suitably mixing the following combination of constituents: (1) the base oil, wherein the base oil includes diesel, a highly-refined mineral oil (e.g., ExxonMobil's Escaid™ 110), a synthetic oil (e.g., alpha olefins, internal olefins, and/or Linear Alkyl paraffins), or a GTL fluid (e.g., Shell's GTL Saraline 185V, Shell's NEOFLO™ 4633, and/or Shrieve's BIO-BASE® 625), or some combination thereof, (2) the oil viscosifying agent, wherein the oil viscosifying includes an SB copolymer and/or an HPI Star polymer, and wherein the oil viscosifying agent is added to the low-density HGB fluid at a concentration in a range between 1.0 wt % and 4.0 wt %; (3) the HGBs at the concentration in the range between 20 vol % and 60 vol %; (4) the organophilic clay, wherein the organophilic clay is added to the low-density HGB fluid at a concentration in a range between 0.5 wt % and 2.0 wt %; (5) the clay activator, wherein the clay activator includes an oil-soluble, polar material, and wherein the clay activator is added to the low-density HGB fluid at a concentration in a range between 0.1 wt % and 0.5 wt %; and (6) the surfactant, wherein the surfactant includes a silicone block copolymer, and wherein the surfactant is added to the low-density HGB fluid at a concentration in a range between 0.1 wt % and 2.0 wt %; and (7) the optional $H_2S$ scavenger, wherein the $H_2S$ scavenger includes a liquid oil-soluble $H_2S$ scavenger added at a concentration in a range between 0.1 wt % and 2.0 wt %.

The process flow diagram of FIG. 12 is not intended to indicate that the steps of the method 1200 are to be executed in any particular order, or that all of the steps of the method 1200 are to be included in every case. Moreover, any number of additional steps not shown in FIG. 12 may be included within the method 1200, depending on the details of the specific implementation.

Figure 13:
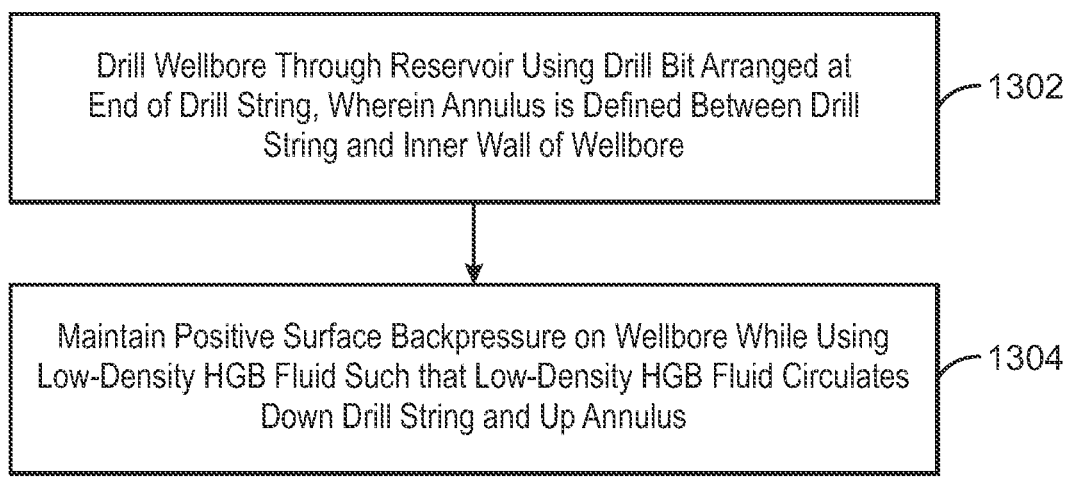
FIG. 13 is a process flow diagram of a method for using the low-density HGB fluids provided herein to maintain the bottomhole pressure within a limited window for a drilling operation employing MPD techniques.

FIG. 13 is a process flow diagram of a method 1300 for using the low-density HGB fluids provided herein to maintain the bottomhole pressure within a limited window for a drilling operation employing MPD techniques. The method 1300 begins at block 1302, at which a wellbore is drilled through a reservoir using a drill bit arranged at an end of a drill string, wherein an annulus is defined between the drill string and an inner wall of the wellbore. At block 1304, a positive surface backpressure is maintained on the wellbore while using a low-density HGB fluid such that the low-density HGB fluid circulates down the drill string and up the annulus of the wellbore. In various embodiments, the low-density HGB fluid includes a combination of constituents formulated to provide a density within a range between 3.5 and 6.0 ppg. In various embodiments, the combination of constituents includes a base oil, an oil viscosifying agent to increase a viscosity of the base oil, HGBs at a concentration in a range between 20 vol % and 60 vol %, an organophilic clay to maintain suspension of the HGBs within the low-density HGB fluid, a clay activator to provide for dispersion of the organophilic clay throughout the low-density HGB fluid, a surfactant to act as a rheology modifier for the low-density HGB fluid, and (optionally) an $H_2S$ scavenger. Furthermore, in various embodiments, maintaining the positive surface backpressure on the wellbore ensures that the wellbore bottomhole pressure (during both flowing and static periods) remains within a limited pressure window that is defined by the pore pressure, the formation stability mud weight, and the fracture gradient corresponding to the reservoir.

In some embodiments, the method 1300 further includes monitoring the wellbore bottomhole pressure, as measured by the ECD downhole and, in response to detected changes in the wellbore bottomhole pressure, adjusting the positive surface backpressure on the wellbore by introducing the low-density HGB fluid into the wellbore at a higher or lower fluid introduction rate and/or adjusting the surface backpressure settings corresponding to the wellbore. In addition, in various embodiments, the method 1300 includes determining a formulation for the low-density HGB fluid by: (1) performing thermal stability testing using an experimental lab apparatus including a glass column that is loaded with a specific formulation of constituents and heated to a predetermined temperature as properties of the constituents within the glass column are observed; and (2) utilizing the observed properties of the constituents to determine a level of static stability of the specific formulation of the low-density HGB fluid. Furthermore, in various embodiments, the method 1300 includes providing the low-density HGB fluid by suitably mixing the following combination of constituents: (1) the base oil, wherein the base oil includes diesel, a highly-refined mineral oil (e.g., ExxonMobil's Escaid™ 110), a synthetic oil (e.g., alpha olefins, internal olefins, and/or Linear Alkyl paraffins), or a GTL fluid (e.g., Shell's GTL Saraline 185V, Shell's NEOFLO™ 4633, and/or Shrieve's BIO-BASE® 625), or some combination thereof, (2) the oil viscosifying agent, wherein the oil viscosifying includes an SB copolymer and/or an HPI Star polymer, and wherein the oil viscosifying agent is added to the low-density HGB fluid at a concentration in a range between 1.0 wt % and 4.0 wt %; (3) the HGBs at the concentration in the range between 20 vol % and 60 vol %; (4) the organophilic clay, wherein the organophilic clay is added to the low-density HGB fluid at a concentration in a range between 0.5 wt % and 2.0 wt %; (5) the clay activator, wherein the clay activator includes an oil-soluble, polar material, and wherein the clay activator is added to the low-density HGB fluid at a concentration in a range between 0.1 wt % and 0.5 wt %; (6) the surfactant, wherein the surfactant includes a silicone block copolymer, and wherein the surfactant is added to the low-density HGB fluid at a concentration in a range between 0.1 wt % and 2.0 wt %; and (7) the optional $H_2S$ scavenger, wherein the $H_2S$ scavenger includes a liquid oil-soluble $H_2S$ scavenger added at a concentration in a range between 0.1 wt % and 2.0 wt %.

The process flow diagram of FIG. 13 is not intended to indicate that the steps of the method 1300 are to be executed in any particular order, or that all of the steps of the method 1300 are to be included in every case. Moreover, any number of additional steps not shown in FIG. 13 may be included within the method 1300, depending on the details of the specific implementation.

Figure 14:
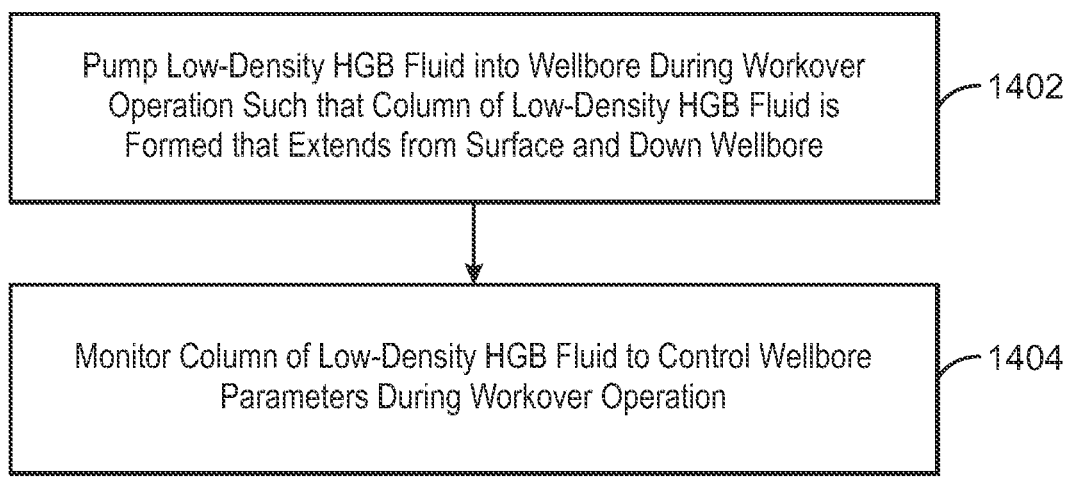
FIG. 14 is a process flow diagram of a method for using the low-density HGB fluids provided herein to enhance a workover operation corresponding to a wellbore.

FIG. 14 is a process flow diagram of a method 1400 for using the low-density HGB fluids provided herein to enhance a workover operation corresponding to a wellbore. In various embodiments, the wellbore corresponds to one or more very-low-pressure or highly-depleted reservoirs. Moreover, in various embodiments, conventional lightweight fluids may not be suitable for optimizing workover operations for wellbores corresponding to such reservoirs. Accordingly, the method 1400 provides for the application of the low-density HGB fluids provided herein to such workover operations.

The method 1400 begins at block 1402, at which the low-density HGB fluid is pumped into the wellbore during a workover operation such that a column of the low-density HGB fluid is formed that extends from the surface (e.g., from any suitable, designated location near the top of the wellbore) and down the wellbore. At block 1404, the column of the low-density HGB fluid is monitored to control wellbore parameters during the workover operation. In various embodiments, the workover operation is used to clean proppant and/or debris out of the wellbore, repair or replace the production tubing and/or other wellbore equipment, abandon a completion interval corresponding to the wellbore, abandon a completion interval corresponding to the wellbore and drill a sidetrack hole, and/or drill a hole section using coiled tubing and the low-density HGB fluid circulating into the coiled tubing, through the drill bit, and up the annulus of the wellbore. Moreover, in various embodiments, the low-density HGB fluid includes a combination of constituents formulated to provide a density within a range between 3.5 ppg and 6.0 ppg. In various embodiments, the combination of constituents includes a base oil, an oil viscosifying agent to increase a viscosity of the base oil, HGBs at a concentration in a range between 20 vol % and 60 vol %, an organophilic clay to maintain suspension of the HGBs within the low-density HGB fluid, a clay activator to provide for dispersion of the organophilic clay throughout the low-density HGB fluid, a surfactant to act as a rheology modifier for the low-density HGB fluid, and (optionally) an $H_2S$ scavenger.

The process flow diagram of FIG. 14 is not intended to indicate that the steps of the method 1400 are to be executed in any particular order, or that all of the steps of the method 1400 are to be included in every case. Moreover, any number of additional steps not shown in FIG. 14 may be included within the method 1400, depending on the details of the specific implementation.

Exemplary Embodiments of Present Techniques

In one or more embodiments, the present techniques may be susceptible to various modifications and alternative forms, such as the following embodiments as noted in paragraphs 1 to 15:

1. A method for performing a drilling operation employing pressurized mudcap drilling (PMCD) techniques using a low-density hollow glass bead (HGB) fluid, comprising: drilling a wellbore through a reservoir using a drill bit arranged at an end of a drill string, wherein an annulus is defined between the drill string and an inner wall of the wellbore; closing the annulus; pressurizing the annulus by introducing a low-density HGB fluid into the annulus; and pumping a sacrificial fluid through the drill string with the low-density HGB fluid placed in the annulus.

2. The method of paragraph 1, wherein the introduction of the low-density HGB fluid into the annulus, in combination with the pumping of the sacrificial fluid through the drill string, ensures that a wellbore pressure at a loss zone is at or near balance with a reservoir pressure and retards the migration of reservoir fluids from a corresponding reservoir to a surface location.

3. The method of paragraph 2, further comprising: detecting migration of the reservoir fluids up the wellbore; and introducing additional low-density HGB fluid into the annulus to flush the reservoir fluids back into the reservoir.

4. The method of any of paragraphs 1 to 3, further comprising: filling the annulus entirely with the low-density HGB fluid up to a surface location; or filling the annulus with the low-density HGB fluid and at least one other liquid or gas fluid up to the surface location.

5. The method of any of paragraphs 1 to 4, comprising providing the low-density HGB fluid with a combination of constituents comprising: a base oil; an oil viscosifying agent to increase a viscosity of the base oil; hollow glass beads (HGBs) at a concentration in a range between 20 vol % and 60 vol % (or in a range between 35 vol % and 60 vol %); an organophilic clay to maintain suspension of the HGBs within the low-density HGB fluid; a clay activator to provide for dispersion of the organophilic clay throughout the low-density HGB fluid; and a surfactant to act as a rheology modifier for the low-density HGB fluid.

6. The method of paragraph 5, comprising providing the low-density HGB fluid by suitably mixing a specific formulation of the following combination of constituents: the base oil, wherein the base oil comprises diesel, a highly-refined mineral oil, a synthetic oil, or a gas-to-liquid (GTL) fluid, or some combination thereof; the oil viscosifying agent, wherein the oil viscosifying comprises a styrene block (SB) copolymer or a Hydrogenated Polyisoprene (HPI) Star polymer, or some combination thereof, and wherein the oil viscosifying agent is added to the low-density HGB fluid at a concentration in a range between 1.0 weight percent (wt %) and 4.0 wt %; the HGBs added at the concentration in the range between 20 vol % and 60 vol %; the organophilic clay, wherein the organophilic clay is added to the low-density HGB fluid at a concentration in a range between 0.5 wt % and 2.0 wt %; the clay activator, wherein the clay activator comprises an oil-soluble, polar material, and wherein the clay activator is added to the low-density HGB fluid at a concentration in a range between 0.1 wt % and 0.5 wt %; and the surfactant, wherein the surfactant comprises a silicone block copolymer, and wherein the surfactant is added to the low-density HGB fluid at a concentration in a range between 0.1 wt % and 2.0 wt %.

7. The method of paragraph 5 or 6, comprising providing the low-density HGB fluid with a hydrogen sulfide ($H_2S$) scavenger as an additional constituent, wherein the $H_2S$ scavenger comprises a liquid oil-soluble $H_2S$ scavenger that is added to the low-density HGB fluid at a concentration in a range between 0.1 wt % and 2.0 wt %.

8. A method for performing a drilling operation employing managed pressure drilling (MPD) techniques using a low-density hollow glass bead (HGB) fluid, comprising: drilling a wellbore through a reservoir using a drill bit arranged at an end of a drill string, wherein an annulus is defined between the drill string and an inner wall of the wellbore; and maintaining a positive surface backpressure on the wellbore while using a low-density HGB fluid such that the low-density HGB fluid circulates down the drill string and up the annulus.

9. The method of paragraph 8, wherein maintaining the positive surface backpressure on the wellbore ensures that a wellbore bottomhole pressure remains within a limited pressure window that is defined by a pore pressure, a formation stability mud weight, and a fracture gradient corresponding to the reservoir.

10. The method of paragraph 8 or 9, comprising: monitoring the wellbore bottomhole pressure, as measured by the equivalent circulating density (ECD) downhole; and in response to detected changes in the wellbore bottomhole pressure, adjusting the positive surface backpressure on the wellbore by introducing the low-density HGB fluid into the wellbore at a higher or lower fluid introduction rate and/or adjusting surface backpressure settings corresponding to the wellbore.

11. The method of any of paragraphs 8 to 10, comprising providing the low-density HGB fluid with a combination of constituents comprising: a base oil; an oil viscosifying agent to increase a viscosity of the base oil; hollow glass beads (HGBs) at a concentration in a range between 20 vol % and 60 vol %; an organophilic clay to maintain suspension of the HGBs within the low-density HGB fluid; a clay activator to provide for dispersion of the organophilic clay throughout the low-density HGB fluid; and a surfactant to act as a rheology modifier for the low-density HGB fluid.

12. The method of paragraph 11, comprising providing the low-density HGB fluid by suitably mixing a specific formulation of the following combination of constituents: the base oil, wherein the base oil comprises diesel, a highly-refined mineral oil, a synthetic oil, or a gas-to-liquid (GTL) fluid, or some combination thereof; the oil viscosifying agent, wherein the oil viscosifying comprises a styrene block (SB) copolymer or a Hydrogenated Polyisoprene (HPI) Star polymer, or some combination thereof, and wherein the oil viscosifying agent is added to the low-density HGB fluid at a concentration in a range between 1.0 wt % and 4.0 wt %; the HGBs added at the concentration in the range between 20 vol % and 60 vol %; the organophilic clay, wherein the organophilic clay is added to the low-density HGB fluid at a concentration in a range between 0.5 wt % and 2.0 wt %; the clay activator, wherein the clay activator comprises an oil-soluble, polar material, and wherein the clay activator is added to the low-density HGB fluid at a concentration in a range between 0.1 wt % and 0.5 wt %; and the surfactant, wherein the surfactant comprises a silicone block copolymer, and wherein the surfactant is added to the low-density HGB fluid at a concentration in a range between 0.1 wt % and 2.0 wt %.

13. The method of paragraph 11 or 12, comprising providing the low-density HGB fluid with a hydrogen sulfide ($H_2S$) scavenger as an additional constituent, wherein the $H_2S$ scavenger comprises a liquid oil-soluble $H_2S$ scavenger that is added to the low-density HGB fluid at a concentration in a range between 0.1 wt % and 2.0 wt %.

14. A method for using a low-density HGB fluids to enhance a workover operation corresponding to a wellbore, comprising: pumping a low-density HGB fluid into a wellbore during a workover operation such that a column of the low-density HGB fluid is formed that extends from the surface and down the wellbore; and monitoring the column of the low-density HGB fluid to control wellbore parameters during the workover operation.

15. The method of paragraph 14, comprising providing the low-density HGB fluid with a combination of constituents comprising: a base oil; an oil viscosifying agent to increase a viscosity of the base oil; hollow glass beads (HGBs) at a concentration in a range between 20 vol % and 60 vol %; an organophilic clay to maintain suspension of the HGBs within the low-density HGB fluid; a clay activator to provide for dispersion of the organophilic clay throughout the low-density HGB fluid; and a surfactant to act as a rheology modifier for the low-density HGB fluid.

While the embodiments described herein are well-calculated to achieve the advantages set forth, it will be appreciated that such embodiments are susceptible to modification, variation, and change without departing from the spirit thereof. In other words, the particular embodiments described herein are illustrative only, as the teachings of the present techniques may be modified and practiced in different but equivalent manners apparent to those skilled in the art having the benefit of the teachings herein. Furthermore, no limitations are intended on the details of formulation, construction, or design herein shown, other than as described in the claims below. Moreover, the systems and methods illustratively disclosed herein may suitably be practiced in the absence of any element that is not specifically disclosed herein and/or any optional element disclosed herein. While compositions and methods are described in terms of "comprising" or "including" various components or steps, the compositions and methods can also "consist essentially of" or "consist of" the various components and steps. Indeed, the present techniques include all alternatives, modifications, and equivalents falling within the true spirit and scope of the appended claims.

What is claimed is:

1. A method for performing a drilling operation employing pressurized mudcap drilling (PMCD) techniques using a hollow glass bead (HGB) fluid, comprising:
   providing an HGB fluid with a density of 3.5 pounds per gallon (ppg) to 6.0 ppg by suitably mixing the following combination of constituents:
      a base oil;
      an oil viscosifying agent comprising a hydrogenated polyisoprene (HPI) star polymer;
      hollow glass beads (HGBs);
      an organophilic clay;
      a clay activator comprising an oil-soluble, polar material;
      a surfactant comprising a silicone block copolymer; and
      a liquid oil-soluble hydrogen sulfide ($H_2S$) scavenger;
   drilling a wellbore through a reservoir using a drill bit arranged at an end of a drill string, wherein an annulus is defined between the drill string and an inner wall of the wellbore;
   closing the annulus;
   pressurizing the annulus by introducing the HGB fluid into the annulus; and
   pumping a sacrificial fluid through the drill string with the HGB fluid placed in the annulus.

2. The method of claim 1, wherein the introduction of the HGB fluid into the annulus, in combination with the pumping of the sacrificial fluid through the drill string, ensures that a wellbore pressure at a loss zone is at balance with a reservoir pressure and retards a migration of reservoir fluids from a corresponding reservoir to a surface location.

3. The method of claim 2, further comprising:
   detecting migration of the reservoir fluids up the wellbore; and
   introducing additional HGB fluid into the annulus to flush the reservoir fluids back into the reservoir.

4. The method of claim 1, further comprising:
   filling the annulus entirely with the HGB fluid up to a surface location; or
   filling the annulus with the HGB fluid and at least one other fluid up to the surface location.

5. The method of claim 1, wherein;
- the oil viscosifying agent is added HGB fluid at a concentration in a range between 1.0 weight percent (wt %) and 4.0 wt %;
- the HGBs are added to the HGB fluid at a concentration in a range between 20 vol % and 60 vol %;
- the organophilic clay is added to the HGB fluid at a concentration in a range between 0.5 wt % and 2.0 wt %;
- the clay activator is added to the HGB fluid at a concentration in a range between 0.1 wt % and 0.5 wt %; and
- the surfactant is added to the HGB fluid at a concentration in a range between 0.1 wt % and 2.0 wt %.

6. The method of claim 1, wherein the $H_2S$ scavenger is added to the HGB fluid at a concentration in a range between 0.1 weight percent (wt %) and 2.0 wt %.

* * * * *